(12) United States Patent
Kong et al.

(10) Patent No.: US 12,718,022 B2
(45) Date of Patent: Aug. 25, 2026

(54) SYSTEMS AND METHODS FOR USING DOCUMENT ACTIVITY LOGS TO TRAIN MACHINE-LEARNED MODELS FOR DETERMINING DOCUMENT RELEVANCE

(71) Applicant: Google LLC, Mountain View, CA (US)

(72) Inventors: Weize Kong, Mountain View, CA (US); Michael Bendersky, Cupertino, CA (US); Marc Najork, Palo Alto, CA (US); Rama Kumar Pasumarthi, Mountain View, CA (US); Zhen Qin, Mountain View, CA (US); Rolf Jagerman, Diemen (NL)

(73) Assignee: GOOGLE LLC, Mountain View, CA (US)

( * ) Notice: Subject to any disclaimer, the term of this patent is extended or adjusted under 35 U.S.C. 154(b) by 812 days.

(21) Appl. No.: 18/010,727

(22) PCT Filed: Jun. 15, 2020

(86) PCT No.: PCT/US2020/037728

§ 371 (c)(1),
(2) Date: Dec. 15, 2022

(87) PCT Pub. No.: WO2021/257052

PCT Pub. Date: Dec. 23, 2021

(65) Prior Publication Data

US 2023/0267277 A1 Aug. 24, 2023

(51) Int. Cl.
*G06N 20/00* (2019.01)
*G06F 16/9535* (2019.01)
(Continued)

(52) U.S. Cl.
CPC .......... *G06F 40/30* (2020.01); *G06F 16/9535* (2019.01); *G06F 16/9538* (2019.01); *G06N 20/00* (2019.01)

(58) Field of Classification Search
None
See application file for complete search history.

(56) References Cited

U.S. PATENT DOCUMENTS

| | | | |
|---|---|---|---|
| 2010/0082582 A1 | 4/2010 | Gao et al. |
| 2017/0322939 A1 | 11/2017 | Byron et al. |

FOREIGN PATENT DOCUMENTS

| | | |
|---|---|---|
| EP | 2798540 | 11/2014 |
| EP | 3469505 | 4/2019 |

OTHER PUBLICATIONS

International Preliminary Report on Patentability for Application No. PCT/US2020/037728, mailed Dec. 29, 2022, 8 pages.

(Continued)

*Primary Examiner* — David R Vincent
(74) *Attorney, Agent, or Firm* — DORITY & MANNING P.A.

(57) ABSTRACT

Systems and methods of the present disclosure are directed to a method for training a machine-learned semantic matching model. The method can include obtaining a first and second document and a first and second activity log. The method can include determining, based on the first document activity log and the second document activity log, a relation label indicative of whether the documents are related. The method can include inputting the documents into the model to receive a semantic similarity value representing an estimated semantic similarity between the first document and the second document. The method can include evaluating a loss function that evaluates a difference between the relation label and the semantic similarity value. The method can include modifying values of parameters of the model based on the loss function.

15 Claims, 9 Drawing Sheets

(51) Int. Cl.
*G06F 16/9538* (2019.01)
*G06F 40/30* (2020.01)

(56) References Cited

OTHER PUBLICATIONS

International Search Report for Application No. PCT/US2020/037728, mailed Mar. 12, 2021, 2 pages.

SYSTEMS AND METHODS FOR USING DOCUMENT ACTIVITY LOGS TO TRAIN MACHINE-LEARNED MODELS FOR DETERMINING DOCUMENT RELEVANCE

RELATED APPLICATIONS

This application is based upon and claims the right of priority under 35 U.S.C. § 371 to International Application No. PCT/US2020/037728 filed on Jun. 15, 2020. Applicant claims priority to and the benefit of each of such applications and incorporates all such applications herein by reference in their entirety.

FIELD

The present disclosure relates generally to systems and methods for analyzing a similarity or relatedness between documents. More particularly, the present disclosure relates to methods to train and utilize machine-learned semantic similarity models to determine a semantic similarity between documents.

BACKGROUND

Some Internet-based search engines generally utilize user interaction data (e.g., click-through data, click logs, etc.) to search for documents based on a search query. Alternatively, search engines can semantically analyze the content (e.g., text, image data, video data, etc.) of an openly accessible web document to search for documents. However, some search implementations (e.g., cloud storage, private document storage, etc.) can lack access to the content data of documents (e.g., private documents, etc.). Further, these search implementations generally have access only to very sparse user interaction data.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training a machine-learned semantic matching model. The method can include obtaining a first document, a first document activity log associated with the first document, a second document, and a second document activity log associated with the second document. The method can include determining, based at least in part on the first document activity log and the second document activity log, a relation label indicative of whether the first document and the second document are related. The method can include inputting the first document and the second document into the machine-learned semantic matching model to receive, from the machine-learned semantic matching model, a semantic similarity value representing an estimated semantic similarity between the first document and the second document. The method can include evaluating a loss function that evaluates a difference between the relation label and the semantic similarity value. The method can include modifying one or more values of one or more parameters of the machine-learned semantic matching model based on the loss function.

Another aspect of the present disclosure is directed to a computing system for determining semantic similarity between documents. The computing system can include one or more processors. The computing system can include a machine-learned semantic matching model. The model can be configured to obtain a first document and a second document, wherein the first document and second document are different and distinct from one another. The model can be configured to generate, based on the first document and the second document, a semantic similarity value representing an estimated semantic similarity between the first document and the second document. The computing system can include one or more tangible, non-transitory computer readable media storing computer-readable instructions that when executed by the one or more processors cause the one or more processors to perform operations. The operations can include obtaining a search query. The operations can include, in response to obtaining the search query, retrieving a search result document corresponding to the search query. The operations can include inputting the search query and the search result document into the machine-learned semantic matching model, wherein the machine-learned semantic matching model has been trained based at least in part on training data comprising one or more document pairs and one or more respectively associated relation labels, each of the one or more relation labels generated based on a comparison between a pair of activity logs for the document pair respectively associated with the relation label. The operations can include receiving, from the machine-learned semantic matching model, the semantic similarity value representing the estimated semantic similarity between the search query and the search result document. The operations can include ranking, based at least in part on the semantic similarity value, the search result document among a plurality of ranked search result documents.

Another aspect of the present disclosure is directed to one or more tangible, non-transitory computer readable media storing computer-readable instructions that when executed by one or more processors cause the one or more processors to perform operations. The operations can include obtaining a first document, a first document activity log associated with the first document, a second document, and a second document activity log associated with the second document. The operations can include determining, based at least in part on the first document activity log and the second document activity log, a relation label indicative of whether the first document and the second document are related. The operations can include inputting the first document and the second document into a machine-learned semantic matching model to receive, from the machine-learned semantic matching model, a semantic similarity value representing an estimated semantic similarity between the first document and the second document. The operations can include evaluating a loss function that evaluates a difference between the relation label and the semantic similarity value. The operations can include modifying one or more values of one or more parameters of the machine-learned semantic matching model based on the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
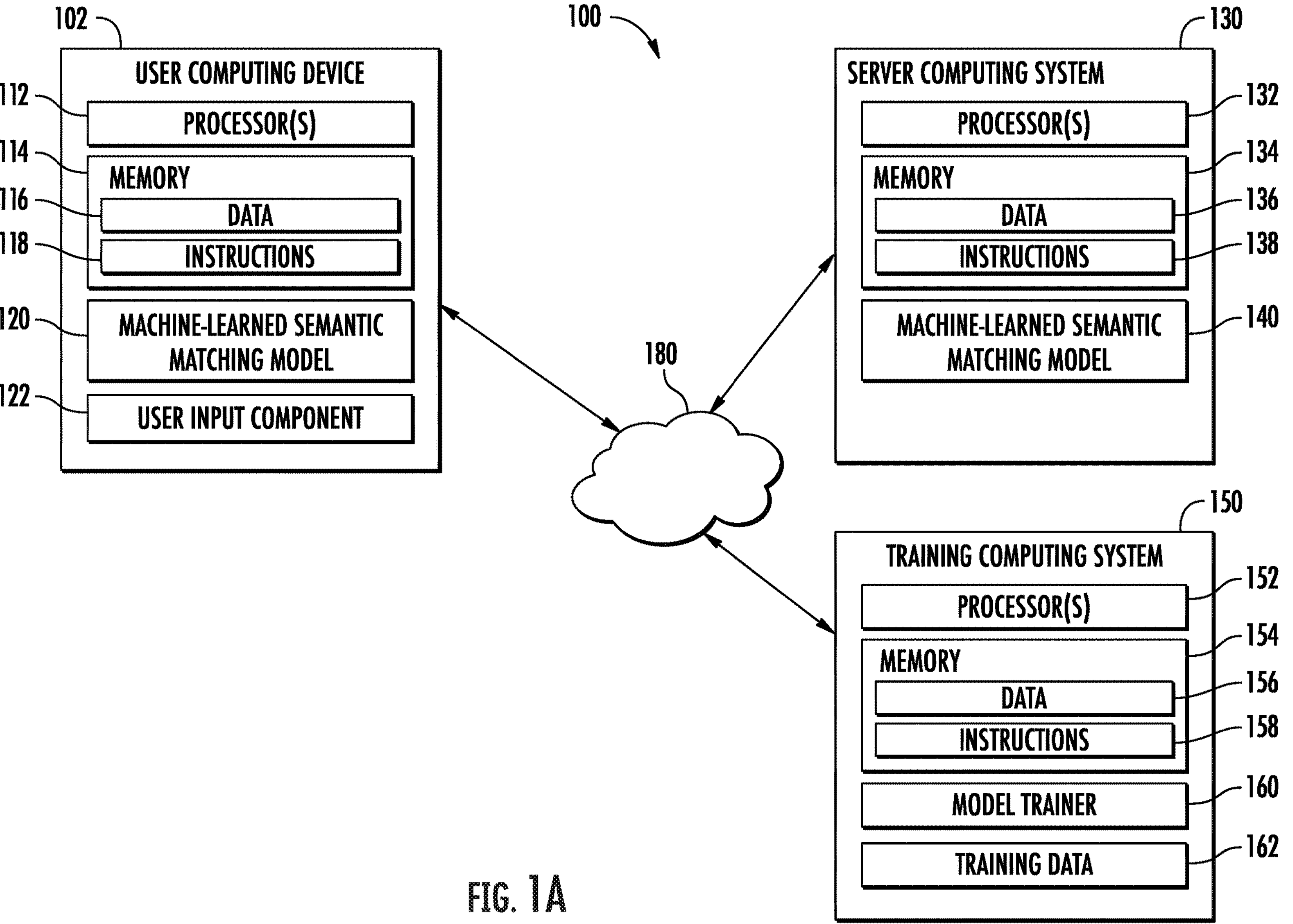
FIG. 1A depicts a block diagram of an example computing system that performs training of a machine-learned semantic matching model according to example embodiments of the present disclosure.

Reference numerals that are repeated across plural figures are intended to identify the same features in various implementations.

DETAILED DESCRIPTION

Overview

Generally, the present disclosure is directed to systems and methods for training and utilizing machine-learned semantic matching model(s). More particularly, the present disclosure is directed to utilizing document access data as a training signal for training machine-learned model(s) to determine a semantic similarity between documents. In such fashion, the model(s) can be trained to accurately and efficiently search for documents in search implementations that lack access to training data in the form of user interaction data and/or the full content data of a document (e.g., cloud storage systems, private document storage, etc.).

As an example, a first document, a first document activity log, a second document, and a second document activity log can be obtained. Based on the activity logs (e.g., logs of document access timestamps, etc.), a relation label can be determined that indicates whether the first and second document are related (e.g., the relation label can be determined based on whether they were accessed within a certain timeframe, etc.). The first and second documents can be input into a machine-learned semantic matching model to obtain a semantic similarity value that represents an estimated semantic similarity between the first document and the second document. The machine-learned semantic matching model can be trained based on a loss function that evaluates a difference between the relation label and the semantic similarity value.

After training, the machine-learned semantic matching model can receive a search query and a search result document and generate a semantic similarity value for the search query and the search result document. In such fashion, document activity logs can be used as a training signal to train a machine-learned semantic matching model to facilitate search operations without the use of click feedback data and very limited access to document content.

More particularly, web-based search methods commonly utilize wide-scale user interaction data (e.g., click rates, etc.) and content analysis techniques (e.g., processing the text of a web-page search result, etc.) to determine the relevance of search result(s). However, some search environments (e.g., cloud-based file storage platforms, private document storage platforms, etc.) store private files that cannot be processed with content analysis techniques. Further, these search environments generally cater to individuals or small organizations, and therefore lack wide-scale user interaction data. This is especially relevant with documents that are sparsely linked. As such, typical search engines cannot be properly utilized to search for documents in these search environments. However, although search environments such as cloud-based file storage platforms lack click-through data and document content, these environments generally have access to detailed and robust document activity logs.

Accordingly, aspects of the present disclosure a method for training a machine-learned semantic matching model based at least in part on document activity logs. More particularly, one or more computing devices can obtain a first document, a first document activity log, a second document, and a second document activity log. In some implementations, the first document and the second document can include content. As an example, the documents may include textual content. As another example, the documents may include image content. As yet another example, the documents may include file content (e.g., document metadata, file paths, etc.). As such, the first and second documents of the present disclosure can refer to any type and/or modality of data (e.g., image data, textual data, metadata, etc.).

In some implementations, the document activity logs (e.g., the first document activity log and the second document activity log, etc.) can respectively describe one or more access events associated with a respective document. As an example, the first document activity log may describe three document access events associated with the first document. As another example, the second document activity log may describe seventeen document access events associated with the second document.

In some implementations, a document access event can include a document access type. A document access type can include and/or describe the type of access event that occurred (e.g., a sharing, opening, or editing of the document, etc.). As an example, the initial creation or upload of a document to a cloud-based file storage platform can constitute a document creation event. Similarly, as another example, the opening of a document after creation can constitute a document opening event. It should be noted that any interaction with the document can constitute a document access event (e.g., editing the document, moving the document, uploading the document, downloading the document, commenting on the document, deleting the document, renaming the document, viewing the document, etc.). In some implementations, the document access event can associate the document access type with a specific user. As an example, for a multi-user cloud-based document storage platform, a document access event can describe a user who performed a document opening event (e.g., by recording a user identifier of the user, etc.).

In some implementations, the document access event can include an access time. More particularly, the document access event can include an access time (e.g., timestamp, etc.) that corresponds to the time that a document access event occurred. As an example, a first user can edit a document at 21:42:00. In response, the document activity log can include a document access event that includes a document editing event and a corresponding access time of 21:42:00. As another example, the first user can share the document at 21:45:05. In response, the document log can include a document access event that includes a document sharing event and a corresponding access time of 21:45:05.

Based on the first document activity log and the second document activity log, a relation label can be determined. The relation label can indicate whether the first document and the second document are related. In some implementations, the relation label can be determined based on access time differences in the respective document activity logs. More particularly, a relation label can be determined based on a difference in time between an access of the first document and an access of the second document, such as whether the difference in time is below a threshold. If two documents are accessed at respective times spaced apart by a difference in time below a threshold, this can be referred to as a "co-access", and the threshold may be referred to as a co-access time threshold.

As an example, suppose that the threshold is ten minutes. The first document activity log can indicate that the first document was accessed (e.g., edited, opened, shared, etc.) at 15:05:00. The second document activity log can indicate that the second document was accessed at 15:06:59. Based on the difference in time between the first document access event and the second document access event, the relation label can indicate that the first document and the second document are related (e.g., a co-access of the documents occurred). As another example, the first document activity log can indicate that the first document was accessed (e.g., edited, opened, shared, etc.) at 15:05:00. The second document activity log can indicate that the second document was accessed at 17:06:59. Based on the difference in time between the first document access event and the second document access event, the relation label can indicate that the first document and the second document are not related (e.g., a co-access of the documents did not occur). It should be noted that the threshold amount of time in between document access events can be a predetermined co-access time threshold (e.g., a co-access occurrence time, etc.). For example, the co-access time threshold can be manually set by a user to be a certain amount of time (e.g., two minutes, three minutes, etc.). As another example, the co-access time threshold can be dynamically determined based on a number of factors (e.g., a number of documents, a number of search results, a type of access event, user identity(s) associated with access event(s), etc.).

More particularly, in some implementations, a relation label can indicate that two documents are related (e.g., a co-access occurred, etc.) if a user opens the two documents in sequence and within a k-minute time window, where k is a discrete value. While there are multiple alternative ways to determine the relation label, a predetermined co-access threshold can generally be found to be conceptually simple, yet empirically effective. Further, the relation label can be motivated by the fact that users often open multiple related documents in a single session, yet can also strive to reduce the number of false positive labels by keeping a narrow time window and optionally discarding non-consecutive co-accesses.

It should be noted that any sort of user interactions can be captured by document activity logs for the respective users, and can be weighted/utilized in training of the machine-learned model(s). As an example, multiple document sharing events between the same two users can be weighed in a certain manner when determining a relation label. As another example, document management actions in a document management system (e.g., a cloud-based document management system, etc.) can be utilized as a signal for the determination of a relation label between documents. As yet another example, a rate of edits to a document can be utilized as a signal for determining a relation label. For example, a document with a high rate of edits can be weighed more heavily than a document that is sparsely edited. In such fashion, any actions performed by any users on a document, and any relationships between users and/or actions, can be utilized as signals for the determination of a relation label between documents.

As an example, first segments of a user's activity logs can be sampled called activity segments. The number of such activity segments can be referred to as N which is an integer which is one or greater, and the activity segments can be labelled by an integer index i which runs from 1 to N. Each activity segment can contain consecutive events from the same user in a consecutive time window. For each activity segment, a set of documents the user accessed can be collected, $$sim(t, t') = \text{sigmoid}(W_{final} h_k + b_{final}).$$

From the document set, all the unordered pairs of documents in the document set can be collected, $P_D=\{\{d, d'\} | d, d' \in D\}$. Relation labels (e.g., co-access labels, etc.) can be extracted for all the document pairs of $P_D$. The relation labels (e.g., co-access labels, etc.) $Y_{d,d'}$ can be defined as:

$$Y_{d,d'} = \begin{cases} 1, & \text{coaccess}(d, d') > 0 \\ 0, & \text{otherwise} \end{cases},$$

Where coaccesses(d,d')>0 can be the number of co-accesses between d and d' in the activity segment. For example, for a collected document set D={d1, d2, d3, d4}, the extracted co-access labels for the document pairs could be: $Y_{d1,d2}=Y_{d1,d3}=1$ (e.g., document pairs d1/d2 and document pairs d1/d3) were co-accessed in the activity segment within the threshold time, and $Y_{d1,d4}=Y_{d2,d3}=Y_{d2,d4}=Y_{d3,d4}=0$ (e.g., document pairs d1/d4, d2/d3, d2/d4, and d3/d4 were not co-accessed in the activity segment within a threshold time).

As such, a training dataset comprising documents and document activity logs:

$$T = \bigcup_{i=1}^{N} \{(d, d', Y_{d,d'}) \mid \{d, d'\} \in P_D^{(i)}\}$$

can be collected from a large number of activity segments, where Nis the number of the segments.

In some implementations, the relation label can be further based at least in part on a first document access type and a second document access type described by the second document activity log. As an example, each document access type (e.g., a document creation event, document opening event, document sharing event, etc.) can be weighted differently. For example, a document sharing event may be weighed more heavily than a document opening event (e.g. whereas $Y_{d1,d2}$ may be equal to a first value (e.g. one) for a given activity segment if the documents d1/d2 were opened in the activity segment at respective times spaced apart by less than the threshold time, it may be equal to a higher value (e.g. two) for the activity segment if the documents were shared in the activity segment at respective times spaced apart by less than the threshold time). As another example, a document creation event may be weighed more heavily than a document editing event. The weights of the types of access events described by the document activity logs can be used, alongside the amount of time between access events, to determine the relation label. As an example, the determination of the relation label can require a certain weight of combined access events in addition to a certain amount of time between the access events for the relation label to indicate that the documents are related.

In some implementations, the relation label can be a binary value. The binary value relation label can indicate that the first and second documents are related or that the first and second documents are not related. Alternatively, in some implementations, the relation label can be a scalar value that indicates a degree of relatedness between the first document and the second document. As an example, if the access event types described by the document activity logs are strongly weighted, and the amount of time between access events is lower than a threshold amount, the relation label can include a scalar value that indicates the first document and the second document are strongly related. As another example, if the access event types described by the document activity logs are weakly weighted, and the amount of time between access events is higher than a threshold amount, the relation label can include a scalar value that indicates the first document and the second document are weakly related. In such fashion, the scalar value can indicate a degree of relatedness between the first document and the second document.

The first document and the second document can be input to the machine-learned semantic matching model. The machine-learned semantic matching model can be or can otherwise include one or more neural networks (e.g., deep neural networks) or the like. Neural networks (e.g., deep neural networks) can be feed-forward neural networks, convolutional neural networks, and/or various other types of neural networks. As an example, the machine-learned semantic matching model can be or can otherwise include one or more recurrent neural networks.

The machine-learned semantic matching model can be configured to obtain the first document and the second document. The machine-learned semantic matching model can be configured to generate a semantic similarity value based on the first document and the second document. The semantic similarity value can represent an estimated semantic similarity between the first document and the second document. As an example, the semantic similarity value can be or otherwise include a scalar value estimating a degree of estimated semantic similarity between the first document and the second document (e.g., 50% estimated semantic similarity, 0.8 estimated semantic similarity, etc.). As another example, the semantic similarity value can be a binary value representing an estimate as to whether the first document is semantically similar to the second document.

In some implementations, the machine-learned semantic matching model can be configured to generate the semantic similarity value by determining a first content embedding and a second content embedding. More particularly, the first content embedding can be determined for the first document based on at least a portion of content of the first document, and the second content embedding for the second document can be determined based on at least a portion of content of the second document. As described previously, the content embedding can be an embedding of the content included in the document (e.g., a text embedding for text content, an image embedding for image content, etc.). The machine-learned semantic matching model can then generate the semantic similarity value based on the first content embedding and the second content embedding.

In some implementations, the content of the first document can include first textual data and the content of the second document can include second textual data. As such, the first content embedding can include a first textual embedding and the second content embedding can include a second textual embedding.

In some implementations, the machine-learned semantic matching model can be configured to determine the first textual embedding by selecting one or more character subsets (e.g., n-grams, etc.) from the first textual data of the first document. As an example, the first textual data of the first document can include characters "COMP VIS: COMPUTER VISION RESEARCH PERIODICAL 2017." One or more character subsets can be selected from a plurality of character subsets (e.g., COMP, VIS, COMP, UTER, COMPUTER, VIS, ION, VISION, etc.) based on an appearance frequency of the character subsets (e.g., COMP, VIS, etc.). For example, to use the previous example characters "COMP VIS: COMPUTER VISION RESEARCH PERIODICAL 2017," the character subsets "COMP" and "VIS" may be selected as they appear more frequently than other character subsets (e.g., n-grams, etc.).

In some implementations, the selected one or more character subsets can be projected into a learned k dimensional vector space to form n-gram embeddings. Alternatively, or additionally, the one or more selected character subsets can each be respectively mapped to a respective n-gram embedding. The n-gram embeddings can be averaged to determine the first textual embedding. The averaging of the one or more character subsets can be performed using any conventional averaging techniques and/or can be performed by one or more layers of the machine-learned semantic matching model. The second textual embedding can be determined in the same manner as the first textual embedding.

More particularly, in some implementations, the machine-learned semantic matching can be or otherwise include a machine-learned concatenation semantic matching model. The machine-learned concatenation semantic matching model can first compute an embedding for the text documents t and t'. Each character subset (e.g., n-gram) in the texts t and t' can mapped to an embedding where only the most frequent character subsets (e.g., n-grams) are retained to limit the vocabulary and make the problem computationally feasible. The character subsets (e.g., n-grams) for t and t' can then be averaged to obtain emb(t) and emb(t') respectively. The representations are concatenated to obtain a joint representation:

$$h_0 = [emb(t), emb(t')].$$

The joint representation $h_0$ can be passed through one or more dense feed-forward layers of the machine-learned semantic matching model, where each layer $h_i$ is defined as:

$$h_i = \phi(W_i h_{i-1} + b_i)$$

where $\phi$ can be an activation function (e.g., rectified linear unit (ReLU), tanh, etc.). The last layer of the machine-learned concatenation semantic matching network, $h_k$, can be reduced to a scalar value and mapped to a probability via a sigmoid function:

$$sim(t, t') = \text{sigmoid } (W_{final} h_k + b_{final}).$$

Alternatively, in some implementations, the machine-learned semantic matching model can be or otherwise include a machine-learned siamese semantic matching model. The machine-learned siamese semantic matching model can embed the text documents t and t' to their respective textual embeddings emb(t) and emb(t'). The text embeddings can be passed through a shared feed-forward neural network to formally determine:

$$h_0' = emb(t);\ h_0'' = emb(t');\ h_i' = \phi(W_i h_{i-1}' + b_i);\ \text{and}\ h_i'' = \phi(W_i h_{i-1}'' + b_i).$$

It should be noted that the weights $W_i$ and $b_i$ at each layer can be shared for both t and t'. The output vectors of the last layer, $$h_k' \text{ and } h_k'',$$

can be joined via dot product and then passed through a sigmoid to obtain:

$$sim(t, t') = \text{sigmoid}(h_k' * h_k'').$$

After inputting the first document and the second document to the machine-learned semantic matching model, the semantic similarity value representing the estimated semantic similarity between the first document and the second document can be received. A loss function can be evaluated that evaluates a difference between the relation label and the semantic similarity value. As such, in some implementations, the difference between the relation label and the semantic similarity value can serve as a supervisory training signal to the machine-learned semantic matching model. As an example, the semantic similarity value may indicate that the first document and the second document are strongly semantically similar, while the relation label may indicate that the first document and the second document are not related. The loss function can evaluate the difference between the semantic similarity value and the relation label.

Based on the loss function, one or more values for one or more parameters of the machine-learned semantic similarity model can be modified. As an example, the difference evaluated by the loss function can be backpropagated through the machine-learned semantic similarity model to determine values associated with one or more parameters of the model to be updated. The one or more parameters can be updated to reduce the difference evaluated by the loss function (e.g., using an optimization procedure, such as a gradient descent algorithm).

More particularly, as an example, the semantic matching model can be trained by minimizing the weighted cross-entropy loss defined as follows:

$$-\sum_{i=1}^{N} \sum_{(d,d' \in P_D^{(i)})}^{N} y_{d,d'}^{(i)} \log(sim(d, d')) + \lambda\left(1 - y_{d,d'}^{(i)}\right) \log(1 - sim(d, d'))$$

in which, as an example, the titles of the first document and second document are used as the textual content for each document when scoring sim(d, d') and $\lambda \in (0,1]$ can be used as a hyperparameter to down-weight the loss for negative document pairs. The weighting can be used to address data imbalance problems in the dataset. However, it should be noted that in practice, a small percentage of document pairs are generally co-accessed, and the majority of document pairs are not co-accessed. Note that in the above example, for each pair of documents, corresponding relation labels can be derived for each of the N respective activity segments, and the loss function can be a sum over the activity segments. In a variation, for each pair of documents, the respective relation labels for the N activity segments may be averaged to form an averaged relation label for each pair of documents, and the loss function may be based on the averaged relation labels, instead of (or in addition to) the relation labels for the individual activity segments.

It should be noted that a first and second document are included merely to more simply facilitate description the method of the present embodiments. However, any number of document pairs can be utilized to train the machine-learned semantic matching model. As an example, the training data (e.g., the first document, the second document, the first document activity log, the second document activity log, etc.) may further include hundreds, thousands or more additional pairs of documents and respectively associated document activity logs. Each of these additional documents and document activity logs can be utilized as described previously to train the machine-learned semantic matching model across a plurality of training iterations.

Once trained, a machine-learned semantic matching model can be utilized to facilitate searching operations in certain search environments (e.g., cloud-based document storage platforms, etc.). More particularly, a search query can be obtained. As an example, the search query may be received from a user searching for documents in a cloud-based file storage platform. It should be noted that the search query can be included in a document, can be a document, or can otherwise be processed as a document. As such, the machine-learned semantic matching model can be configured to process the search query as it would a document. Further, the search query can include or correspond to the content of any previously described document (e.g., textual content, image content, etc.). As an example, the search query may be or include text describing the search query. As another example, a user can perform a reverse image search in a cloud-based storage platform, and the search query can be a hash representation or latent space representation of the image utilized for the query.

In response to obtaining the search query, a search result document corresponding to the search query can be retrieved. The search result document can be retrieved using any sort of conventional or machine-learned technique(s) or algorithm(s). As an example, the search result document may be retrieved based on the search result document being the most recently opened document. As another example, the search result document may be retrieved based on the search result document corresponding to a certain alphabetical order amongst a plurality of documents. It should be noted that any form of operations (e.g., masking, selection, discarding, etc.) for retrieving of search result document(s) among a plurality of documents can be utilized. As an example, if the search query includes textual content, any search result document not including textual content can be excluded.

The search query and the search result document can be input into the machine-learned semantic matching model to obtain a semantic similarity value that represents an estimated semantic similarity between the search query and the search result document. Based on the semantic similarity value, the search result document can be ranked among a plurality of ranked search result documents. More particularly, a plurality of previous search result documents can be sequentially input alongside the search query to the machine-learned semantic matching model to generate a plurality of semantic similarity values which can be used to sequentially rank the plurality of ranked search result documents. Thus, in such fashion, the machine-learned semantic matching model can be used to efficiently and accurately produce ranked search results for a user in response to a search query.

Alternatively, or additionally, in some implementations, the ranked search results can be utilized to recluster the plurality of ranked search results based on the semantic similarity values of the documents. More particularly, the search result documents can be clustered according to a pre-existing clustering order (e.g., associated with each other by a certain relationship, etc.). As an example, the documents may be clustered together based on an initial perceived semantic similarity to facilitate faster search result document retrieval. Based on the semantic similarity values assigned to each of the plurality of search result documents, the search result documents can be accordingly reclustered (e.g., declustered and then reclustered, etc.) based on a difference between the initial clusterings of the documents and the semantic similarity values between documents as determined by the machine-learned semantic matching model.

In some implementations, the ranked search results can be provided to a user. As an example, a user can enter a search query to a user device (e.g., smartphone, desktop computer, terminal, etc.) for searching a search environment such as a cloud-based file storage platform. Search results can be retrieved based on the search query entered to the user device, and can be ranked accordingly using the machine-learned semantic matching model. The ranked search results can be provided to the user device (e.g., smartphone, etc.) in a user interface corresponding to the interface utilized to enter the search query (e.g., a web page associated with the cloud-based file storage platform, etc.).

The content of any document accessed for training of the machine-learned semantic matching model can be k-anonymized to protect the privacy of documents. More particularly, the generation of embeddings by utilizing subsets of information from the content of the documents (e.g., from selection of text n-grams, etc.) ensures that no sensitive data is extracted from the content of the documents. Rather, the data is extracted from the content of the documents such that the data is not decipherable. As such, the privacy of users is fully ensured when utilizing any document content (e.g., documents in a cloud-based storage platform, etc.).

The present disclosure provides a number of technical effects and benefits. As one example technical effect and benefit, the systems and methods of the present disclosure enable the training of a more efficient and more accurate machine-learned semantic matching model for searching of certain search environments (e.g., a cloud-based file storage platform, etc.). As an example, certain search environments do not provide enough click data for training, and often must obscure the content of stored documents for user privacy reasons. As such, the present disclosure provides methods to utilize document activity logs to train a machine-learned semantic matching model to quickly and accurately provide users with search results. By more quickly and more efficiently providing search results, the present disclosure reduces the number of searches required by a user to find a certain document, therefore reducing human effort as well as computational resources (e.g., instruction cycles, electricity, bandwidth, etc.) used for a computing system to perform search operations. In effect, the disclosure provides an automated labelling of a potentially large database of documents. Though the labelling employs the content of the documents, it does not necessarily require semantic interpretation of the content, and is accordingly objective. The relation labels are based on objective technical data (e.g. relating to access events and access times). When the content of the files is employed, this may be done in an objective manner (e.g. with character strings selected based on appearance frequency rather than semantic significance). In particular, the present technique does not require subjective labels indicating the semantic significance of the content of the documents.

More particularly, multiple query operations can require significant bandwidth and resource utilization. As an example, a cloud-based file storage platform computing system, in response to multiple queries, may retrieve large batches of files that can include significant amounts of data (e.g., video files, image files, large text files, etc.). Further, in storage platforms with significant numbers of files, searching operations can require significant processing power to iterate through relatively large numbers of files using conventional search techniques. By increasing the accuracy of search retrieval, and therefore reducing the number of average searches required by users, the present disclosure provides systems and methods that can significantly reduce the amount of computational resources expended for search retrieval operations.

Furthermore, in cases in which the system provides similarity scores based on one or more character subsets, and in particular character subsets selected based on an appearance frequency of the character subset (e.g. an appearance frequency above a threshold), the similarity score can be calculated without reference to confidential information represented by other character strings. Note that these other character strings may be rarer strings which relate to confidential information in confidential documents in the database. Thus, selecting the character strings based on the appearance frequency enables the document retrieval system to be operated with greater privacy and security, compared for example to a case in which the whole of documents is used to generate the semantic similarity score.

With reference now to the Figures, example embodiments of the present disclosure will be discussed in further detail.

Example Devices and Systems

FIG. 1A depicts a block diagram of an example computing system 100 that performs training of a machine-learned semantic matching model according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned semantic matching models 120. For example, the machine-learned semantic matching models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned semantic matching models 120 are discussed with reference to FIGS. 1A-1C.

In some implementations, the one or more machine-learned semantic matching models 120 can be received from the server computing system 130 over network 180, stored in the user computing device memory 114, and then used or otherwise implemented by the one or more processors 112. In some implementations, the user computing device 102 can implement multiple parallel instances of a single machine-learned semantic matching model 120 (e.g., to perform parallel semantic matching across multiple instances of documents and/or search queries).

More particularly, the machine-learned semantic matching model 120 can be trained (e.g., using training computing system 150, etc.) utilizing document access data (e.g., training data 162, etc.) as a training signal for training the machine-learned semantic matching model 120 to determine a semantic similarity between documents. In such fashion, the machine-learned semantic matching model 120 can be trained to accurately and efficiently search for documents in search implementations that lack access to user interaction data and document content data (e.g., cloud storage systems, private document storage, etc.). As an example, a first document, a first document activity log, a second document, and a second document activity log can be obtained by the training computing system 150. Based on the activity logs (e.g., logs of document access timestamps, etc.), a relation label can be determined that indicates whether the first and second document are related (e.g., whether they were accessed within a certain timeframe, etc.). The first and second documents can be input into a machine-learned semantic matching model to obtain a semantic similarity value that represents an estimated semantic similarity between the first document and the second document. The machine-learned semantic matching model 120 can be trained based on a loss function that evaluates a difference between the relation label and the semantic similarity value. After training, the machine-learned semantic matching model 120 can receive a search query (e.g., from user input component 122, etc.) and a search result document (e.g., from a server computing system 130, from a user computing device 102, etc.) and generate a semantic similarity value for the search query and the search result document. In such fashion, document activity logs can be used as a training signal to train a machine-learned semantic matching model 120 to facilitate search operations without the use of click feedback data and access to document content Additionally, or alternatively, one or more machine-learned semantic matching models 140 can be included in or otherwise stored and implemented by the server computing system 130 that communicates with the user computing device 102 according to a client-server relationship. For example, the machine-learned semantic matching models 140 can be implemented by the server computing system 140 as a portion of a web service (e.g., a cloud-based file storage service). Thus, one or more machine-learned semantic matching models 120 can be stored and implemented at the user computing device 102 and/or one or more machine-learned semantic matching models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. As an example, a user could utilize a touch-sensitive component (e.g., a virtual keyboard) to enter a search query as input to the user computing device 102.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned semantic matching models 140. For example, the machine-learned semantic matching models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. As an example, the training computing system 150 can receive document activity logs associated with a plurality of training documents from server computing system 130 (e.g., via network 180, etc.). Using the document activity logs and the training documents, the training computing system 150 can train the machine-learned semantic matching model 120/140 using the model trainer 160.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned semantic matching models 120 and/or 140 based on a set of training data 162. The training data 162 can include, for example, a plurality of training documents and a plurality of document activity logs respectively associated with the plurality of training documents. For example, the training data 162 can include a first document, a first document activity log, a second document, and a second document activity log. In some implementations, the first document and the second document can include content. As an example, the documents may include textual content. As another example, the documents may include image content. As yet another example, the documents may include file content (e.g., document metadata, file paths, etc.). As such, the first and second documents of the present disclosure can refer to any sort and/or type of data (e.g., image data, textual data, metadata, etc.).

In some implementations, the document activity logs (e.g., the first document activity log and the second document activity log, etc.) can respectively describe one or more access events associated with a respective document. As an example, the first document activity log may describe three document access events associated with the first document. As another example, the second document activity log may describe seventeen document access events associated with the second document.

In some implementations, a document access event can include a document access type. A document access type can include and/or describe the type of access event that occurred (e.g., a sharing, opening, or editing of the document, etc.). As an example, the initial creation or upload of a document to a cloud-based file storage platform can constitute a document creation event. Similarly, as another example, the opening of a document after creation can constitute a document opening event. It should be noted that any interaction or access of the document can constitute a document access event (e.g., editing the document, moving the document, uploading the document, downloading the document, commenting on the document, deleting the document, renaming the document, viewing the document, etc.). In some implementations, the document access event can associate the document access type with a specific user. As an example, for a multi-user cloud-based document storage platform, a document access event can describe a user who performed a document opening event (e.g., by recording a user identifier of the user, etc.).

In some implementations, the document access event can include an access time. More particularly, the document access event can include an access time (e.g., timestamp, etc.) that corresponds to the time that a document access event occurred. As an example, a first user can edit a document at 21:42:00. In response, the document activity log can include a document access event that includes a document editing event and a corresponding access time of 21:42:00. As another example, the first user can share the document at 21:45:05. In response, the document log can include a document access event that includes a document sharing event and a corresponding access time of 21:45:05.

Based on the first document activity log and the second document activity log, a relation label can be determined. The relation label can indicate whether the first document and the second document are related. In some implementations, the relation label can be determined based on access time differences in the respective document activity logs. More particularly, a relation label can be determined based on a difference in time between an access of the first document and an access of the second document.

As an example, the first document activity log can indicate that the first document was accessed (e.g., edited, opened, shared, etc.) at 15:05:00. The second document activity log can indicate that the second document was accessed at 15:06:59. Based on the difference in time between the first document access event and the second document access event, the relation label can indicate that the first document and the second document are related (e.g., a co-access of the documents occurred). As another example, the first document activity log can indicate that the first document was accessed (e.g., edited, opened, shared, etc.) at 15:05:00. The second document activity log can indicate that the second document was accessed at 17:06:59. Based on the difference in time between the first document access event and the second document access event, the relation label can indicate that the first document and the second document are not related (e.g., a co-access of the documents did not occur). It should be noted that the amount of time in between document access events can be a predetermined co-access time threshold (e.g., a co-access occurrence time, etc.). For example, the co-access time threshold can be manually set by a user to be a certain amount of time (e.g., two minutes, three minutes, etc.). As another example, the co-access time threshold can be dynamically determined based on a number of factors (e.g., a number of documents, a number of search results, a type of access event, user identity(s) associated with access event(s), edit rate for document(s), etc.).

More particularly, in some implementations, a relation label can indicate that two documents are related (e.g., a co-access occurred, etc.) if a user opens the two documents in sequence and within a k-minute time window. While there are multiple alternative ways to determine the relation label, a predetermined co-access threshold can generally be found to be conceptually simple, yet empirically effective. Further, the relation label can be motivated by the fact that users often open multiple related documents in a single session, yet can also strive to reduce the number of false positive labels by keeping a narrow time window and discarding non-consecutive co-accesses. Therefore, even sparsely linked documents can still be linked via a relation label, and as such, user activity can be used as a signal for document ranking.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model. However, it should be noted that the content of any document accessed for training of the machine-learned semantic matching model 120 and/or 140 is k-anonymized to protect the privacy of documents. More particularly, the generation of embeddings by utilizing subsets of information from the content of the documents (e.g., from selection of text n-grams, etc.) ensures that no sensitive data is extracted from the content of the documents to generate training data 162. Rather, the data is extracted from the content of the documents for training data 162 such that the data is not decipherable. As such, the privacy of users is fully ensured when utilizing any document content (e.g., documents in a cloud-based storage platform, etc.).

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as a RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
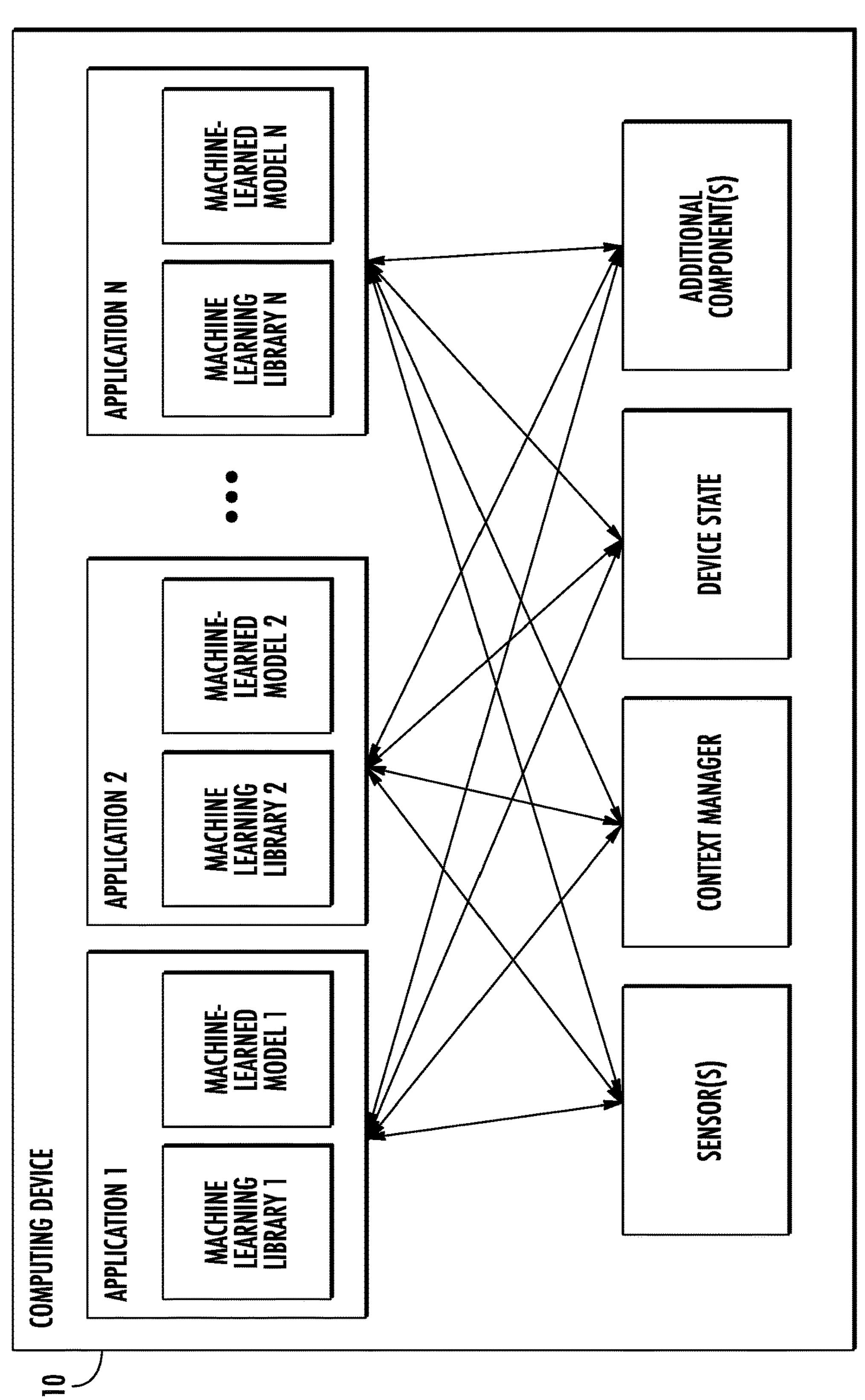
FIG. 1B depicts a block diagram of an example computing device that performs orchestration of a machine-learned semantic matching model across multiple layers according to example embodiments of the present disclosure.

FIG. 1B depicts a block diagram of an example computing device 10 that performs machine-learned semantic document matching according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
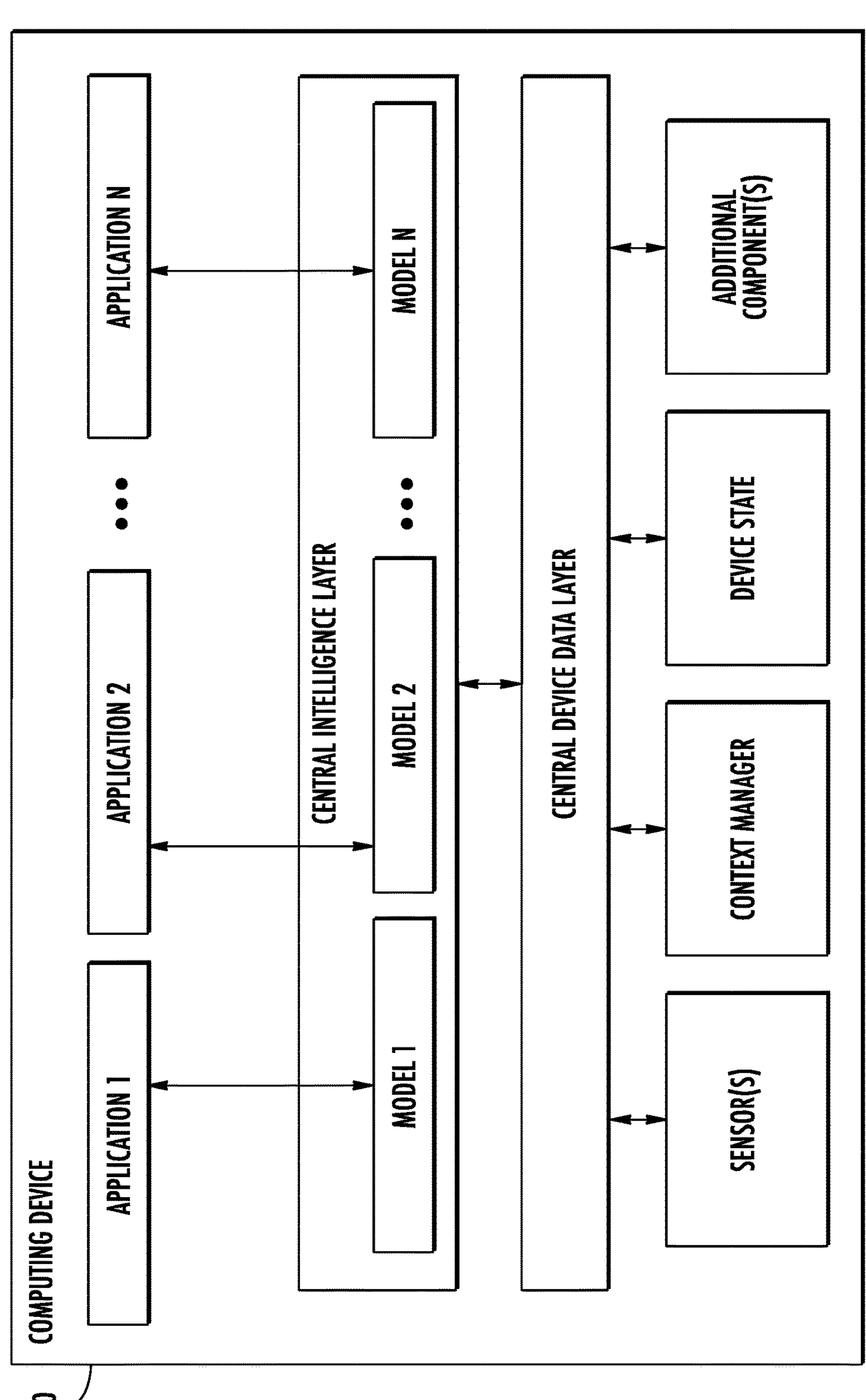
FIG. 1C depicts a block diagram of an example computing device that performs orchestration of a machine-learned semantic matching model across multiple layers according to example embodiments of the present disclosure.

FIG. 1C depicts a block diagram of an example computing device 50 that performs orchestration of a machine-learned semantic matching model across multiple layers according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a machine-learned semantic matching model) can be provided for each application and managed by the central intelligence layer. In other implementations, two or more applications can share a single machine-learned model. For example, in some implementations, the central intelligence layer can provide a single model (e.g., a single machine-learned semantic matching model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
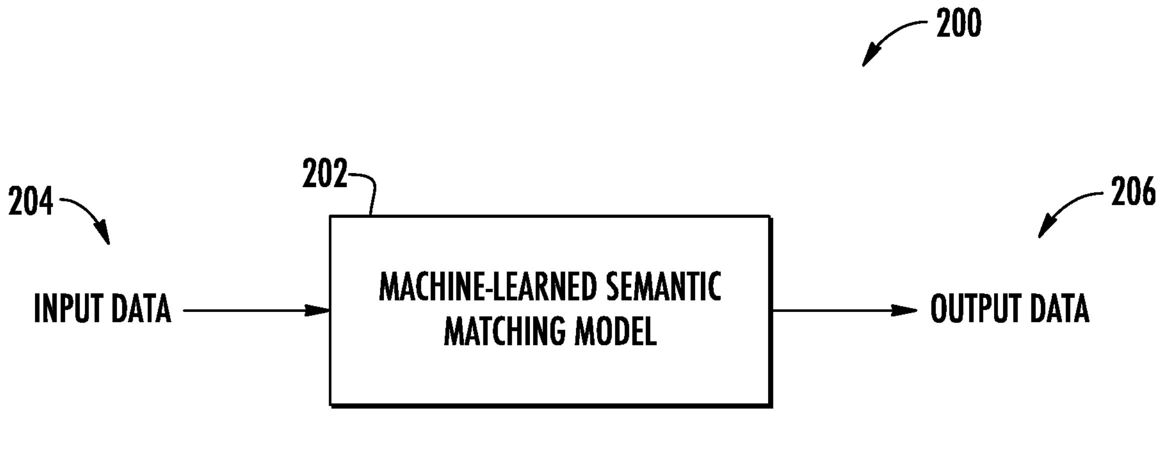
FIG. 2 depicts a block diagram of an example machine-learned semantic matching model according to example embodiments of the present disclosure.

FIG. 2 depicts a block diagram 200 of an example machine-learned semantic matching model 202 according to example embodiments of the present disclosure. In some implementations, the machine-learned semantic matching model 202 is trained to receive a set of input data 204 descriptive of a pair of documents (e.g., two documents, a search query and a corresponding search result document, etc.) and, as a result of receipt of the input data 204, provide output data 206 that includes a semantic similarity value that describes an estimated semantic similarity between the document pair described by the input data. Thus, in some implementations, the machine-learned semantic matching model 202 can be operable to generate output data 206 including a semantic similarity value that describes an estimated semantic similarity between the document pair described by the input data 204.

More particularly, input data 204 describing a search query can be obtained. As an example, the search query may be received from a user searching for documents in a cloud-based file storage platform. It should be noted that the search query can be included in a document, can be a document, or can otherwise be processed as a document. As such, the machine-learned semantic matching model 202 can be configured to process the search query as it would a document. Further, the search query can include or correspond to the content of any previously described document (e.g., textual content, image content, etc.) included in previously received input data 204. As an example, the search query may be or otherwise include text describing the search query. As another example, a user can perform a reverse image search in a cloud-based storage platform, and the search query can be a hash representation or latent space representation of the image utilized for the query.

In response to obtaining the search query, a search result document corresponding to the search query can be retrieved and included in input data 204 (e.g., using a conventional searching algorithm(s), etc.). The search result document can be retrieved using any sort of conventional or machine-learned technique(s) or algorithm(s). As an example, the search result document may be retrieved based on the search result document being the most recently opened document. As another example, the search result document may be retrieved based on the search result document corresponding to a certain alphabetical order amongst a plurality of documents. It should be noted that any form of operations (e.g., masking, selection, discarding, etc.) for retrieving of search result document(s) among a plurality of documents can be utilized. As an example, if the search query includes textual content, any search result document not including textual content can be excluded.

The search query and the search result document can be input into the machine-learned semantic matching model 202 to obtain output data 206 (e.g., a semantic similarity value) that represents an estimated semantic similarity between the search query and the search result document. Based on the semantic similarity value, the search result document can be ranked among a plurality of ranked search result documents. More particularly, a plurality of previous search result documents can be sequentially input alongside the search query to the machine-learned semantic matching model to generate a plurality of semantic similarity values which can be used to sequentially rank the plurality of ranked search result documents. Thus, in such fashion, the machine-learned semantic matching model can be used to efficiently and accurately produce ranked search results for a user in response to a search query.

Figure 3:
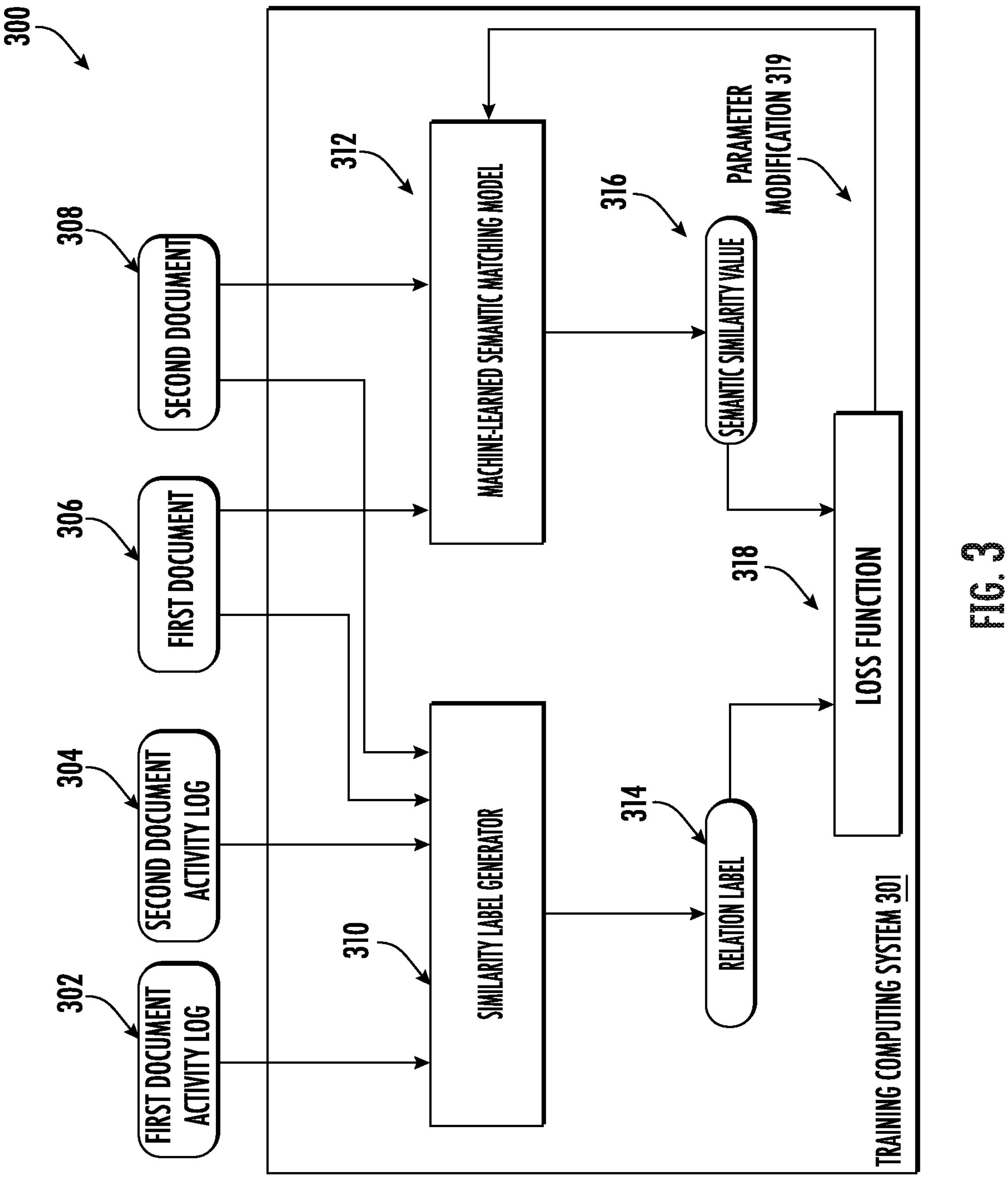
FIG. 3 is a data flow diagram depicting a method for training a machine-learned semantic matching model according to example embodiments of the present disclosure.

FIG. 3 is a data flow diagram depicting a method 300 for training a machine-learned semantic matching model according to example embodiments of the present disclosure. More particularly, training computing system 301 (e.g., training computing system 150 of FIG. 1A, etc.) can obtain a first document 306, a first document activity log 302, a second document 308, and a second document activity log 304. In some implementations, the first document 306 and the second document 308 can include content. As an example, the documents 306/308 may include textual content. As another example, the documents 306/308 may include image content. As yet another example, the documents 306/308 may include file content (e.g., document metadata, file paths, etc.). As such, the first and second documents 306/308 of the present disclosure can refer to any sort and/or type of data (e.g., image data, textual data, metadata, etc.).

In some implementations, the document activity logs 302/304 (e.g., the first document activity log 302 and the second document activity log 304, etc.) can respectively describe one or more access events associated with a respective document. As an example, the first document activity log 302 may describe three document access events associated with the first document 306. As another example, the second document activity log 304 may describe seventeen document access events associated with the second document 308.

In some implementations, a document access event can include a document access type. A document access type can include and/or describe the type of access event that occurred (e.g., a sharing, opening, or editing of the document, etc.). As an example, the initial creation or upload of a document (e.g., 306 and/or 308) to a cloud-based file storage platform can constitute a document creation event. Similarly, as another example, the opening of a document (e.g., 306 and/or 308) after creation can constitute a document opening event. It should be noted that any interaction or access of the document can constitute a document access event (e.g., editing the document, moving the document, uploading the document, downloading the document, commenting on the document, deleting the document, renaming the document, viewing the document, etc.). In some implementations, the document access event can associate the document access type with a specific user. As an example, for a multi-user cloud-based document storage platform, a document access event can describe a user who performed a document opening event (e.g., by recording a user identifier of the user, etc.).

In some implementations, the document access event can include an access time. More particularly, the document access event can include an access time (e.g., timestamp, etc.) that corresponds to the time that a document access event occurred. As an example, a first user can edit a document (e.g., 306 and/or 308) at 21:42:00. In response, the document activity log (e.g., 302 and/or 304) can include a document access event that includes a document editing event and a corresponding access time of 21:42:00. As another example, the first user can share the document (e.g., 306 and/or 308) at 21:45:05. In response, the document log (e.g., 302 and/or 304) can include a document access event that includes a document sharing event and a corresponding access time of 21:45:05.

The relation label generator 310 can receive the first document activity log 302, the second document activity log 304, the first document 306, and the second document 308. Based on the first document activity log 302 and the second document activity log 304, the relation label generator 310 can determine a relation label 314. The relation label 314 can indicate whether the first document 306 and the second document 308 are related (e.g., some sort of relationship exists between the first document 308 and the second document 308, etc.). In some implementations, the relation label 314 can be determined based on access time differences in the respective document activity logs 302/304. More particularly, a relation label 314 can be determined based on a difference in time between an access of the first document 306 and an access of the second document 308.

As an example, the first document activity log 302 can indicate that the first document 306 was accessed (e.g., edited, opened, shared, etc.) at 15:05:00. The second document activity log 304 can indicate that the second document 308 was accessed at 15:06:59. Based on the difference in time between the first document access event and the second document access event, the relation label 314 can indicate that the first document 306 and the second document 308 are related (e.g., a co-access of the documents 306/308 occurred). As another example, the first document activity log 302 can indicate that the first document 306 was accessed (e.g., edited, opened, shared, etc.) at 15:05:00. The second document activity log 304 can indicate that the second document 308 was accessed at 17:06:59. Based on the difference in time between the first document access event and the second document access event, the relation label 314 can indicate that the first document 306 and the second document 308 are not related (e.g., a co-access of the documents did not occur). It should be noted that the amount of time in between document access events can be a predetermined co-access time threshold (e.g., a co-access occurrence time, etc.). For example, the co-access time threshold can be manually set by a user to be a certain amount of time (e.g., two minutes, three minutes, etc.). As another example, the co-access time threshold can be dynamically determined based on a number of factors (e.g., a number of documents, a number of search results, a type of access event, user identity(s) associated with access event(s), etc.).

More particularly, in some implementations, the relation label 314 can indicate that the two documents 306/308 are related (e.g., a co-access occurred, etc.) if a user opens the two documents 306/308 in sequence and within a k-minute time window. While there are multiple alternative ways to determine the relation label 314, a predetermined co-access threshold can generally be found to be conceptually simple, yet empirically effective. Further, the relation label 314 can be motivated by the fact that users often open multiple related documents (e.g., 306, 308, etc.) in a single session, yet can also strive to reduce the number of false positive labels by keeping a narrow time window and discarding non-consecutive co-accesses.

In some implementations, the relation label 314 can be further based at least in part on a first document access type described by the first document activity log 302 and a second document access type described by the second document activity log 304. As an example, each document access type (e.g., a document creation event, document opening event, document sharing event, etc.) can be weighted differently. For example, a document sharing event may be weighed more heavily than a document opening event. As another example, a document creation event may be weighed more heavily than a document editing event. The weights of the types of access events described by the document activity logs 302/304 can be used, alongside the amount of time between access events, to determine the relation label 314. As an example, the determination of the relation label can require a certain weight of combined access events in addition to a certain amount of time between the access events for the relation label 314 to indicate that the documents 306/308 are related.

In some implementations, the relation label 314 can be a binary value. The binary value relation label 314 can indicate that the first document 306 and the second document 308 are related or that the first and second documents 306/308 are not related. Alternatively, in some implementations, the relation label 314 can be a scalar value that indicates a degree of relatedness between the first document 306 and the second document 308. As an example, if the access event types described by the document activity logs 302/304 are strongly weighted, and the amount of time between access events is lower than a threshold amount, the relation label 314 can include a scalar value that indicates the first document 306 and the second document 308 are strongly related. As another example, if the access event types described by the document activity logs 302/304 are weakly weighted, and the amount of time between access events is higher than a threshold amount, the relation label 314 can include a scalar value that indicates the first document 306 and the second document 308 are weakly related. In such fashion, the scalar value (e.g., relation label 314) can indicate a degree of relatedness between the first document 306 and the second document 308.

The first document and the second document can be input to the machine-learned semantic matching model. The machine-learned semantic matching model can be or can otherwise include one or more neural networks (e.g., deep neural networks) or the like. Neural networks (e.g., deep neural networks) can be feed-forward neural networks, convolutional neural networks, and/or various other types of neural networks. As an example, the machine-learned semantic matching model can be or can otherwise include one or more recurrent neural networks.

The machine-learned semantic matching model 312 can be configured to obtain the first document 306 and the second document 308. After obtaining the first document 306 and the second document 308, the machine-learned semantic matching model 312 can be configured to generate a semantic similarity value 316 based on the first document 306 and the second document 308. The semantic similarity value 316 can represent an estimated semantic similarity between the first document 306 and the second document 308. As an example, the semantic similarity value 316 can be or otherwise include a scalar value estimating a degree of estimated semantic similarity between the first document 306 and the second document 308 (e.g., 50% estimated semantic similarity, 0.8 estimated semantic similarity, etc.). As another example, the semantic similarity value 316 can be a binary value representing an estimate as to whether or not the first document 306 is semantically similar to the second document 308.

In some implementations, the machine-learned semantic matching model 312 can be configured to generate the semantic similarity value 316 by determining a first content embedding and a second content embedding. More particularly, the first content embedding can be determined for the first document 306 based on at least a portion of content of the first document 306, and the second content embedding for the second document 308 can be determined based on at least a portion of content of the second document 308. As described previously, the content embedding can be an embedding of the content included in the document 306/308 (e.g., a text embedding for text content, an image embedding for image content, etc.). The machine-learned semantic matching model 312 can then generate the semantic similarity value 316 based on the first content embedding and the second content embedding.

In some implementations, the content of the first document 306 can include first textual data and the content of the second document 308 can include second textual data. As such, the first content embedding can include a first textual embedding and the second content embedding can include a second textual embedding.

In some implementations, the machine-learned semantic matching model 312 can be configured to determine the first textual embedding by selecting one or more character subsets (e.g., n-grams, etc.) from the first textual data of the first document 306. As an example, the first textual data of the first document 306 can include characters "COMP VIS: COMPUTER VISION RESEARCH PERIODICAL 2017." One or more character subsets can be selected from a plurality of character subsets (e.g., COMP, VIS, COMP, UTER, COMPUTER, VIS, ION, VISION, etc.) based on an appearance frequency of the character subsets (e.g., COMP, VIS, etc.). For example, to use the previous example characters "COMP VIS: COMPUTER VISION RESEARCH PERIODICAL 2017," the character subsets "COMP" and "VIS" may be selected as they appear more frequently than other character subsets (e.g., n-grams, etc.).

In some implementations, the selected one or more character subsets can be projected into a learned k dimensional vector space to form n-gram embeddings. The n-gram embeddings can be averaged to determine the textual embedding. The averaging of the one or more character subsets can be performed using any conventional averaging techniques and/or can be performed by one or more layers of the machine-learned semantic matching model 312. The second textual embedding can be determined for the second document 308 in the same manner as the first textual embedding.

After inputting the first document 306 and the second document 308 to the machine-learned semantic matching model 312, the semantic similarity value 316 representing the estimated semantic similarity between the first document 306 and the second document 308 can be received. A loss function 318 can be evaluated that evaluates a difference between the relation label 314 and the semantic similarity value 316. As such, in some implementations, the difference between the relation label 314 and the semantic similarity value 316 can serve as a supervisory training signal to the machine-learned semantic matching model 312 via loss function 318. As an example, the semantic similarity value 316 may indicate that the first document 306 and the second document 308 are strongly semantically similar, while the relation label 314 may indicate that the first document 306 and the second document 308 are not related. The loss function 318 can evaluate the difference between the semantic similarity value 316 and the relation label 314.

Based on the loss function 318, one or more values for one or more parameters of the machine-learned semantic similarity model 312 can be modified via parameter modification 319. As an example, the difference evaluated by the loss function 318 can be backpropagated through the machine-learned semantic similarity model 312 to determine values associated with one or more parameters of the model 312 to be updated via parameter modification 319. The one or more parameters can be updated (e.g., via parameter modification 319, etc.) to reduce the difference evaluated by the loss function 318 (e.g., using an optimization procedure, such as a gradient descent algorithm via parameter modification 319, etc.).

Figure 4:
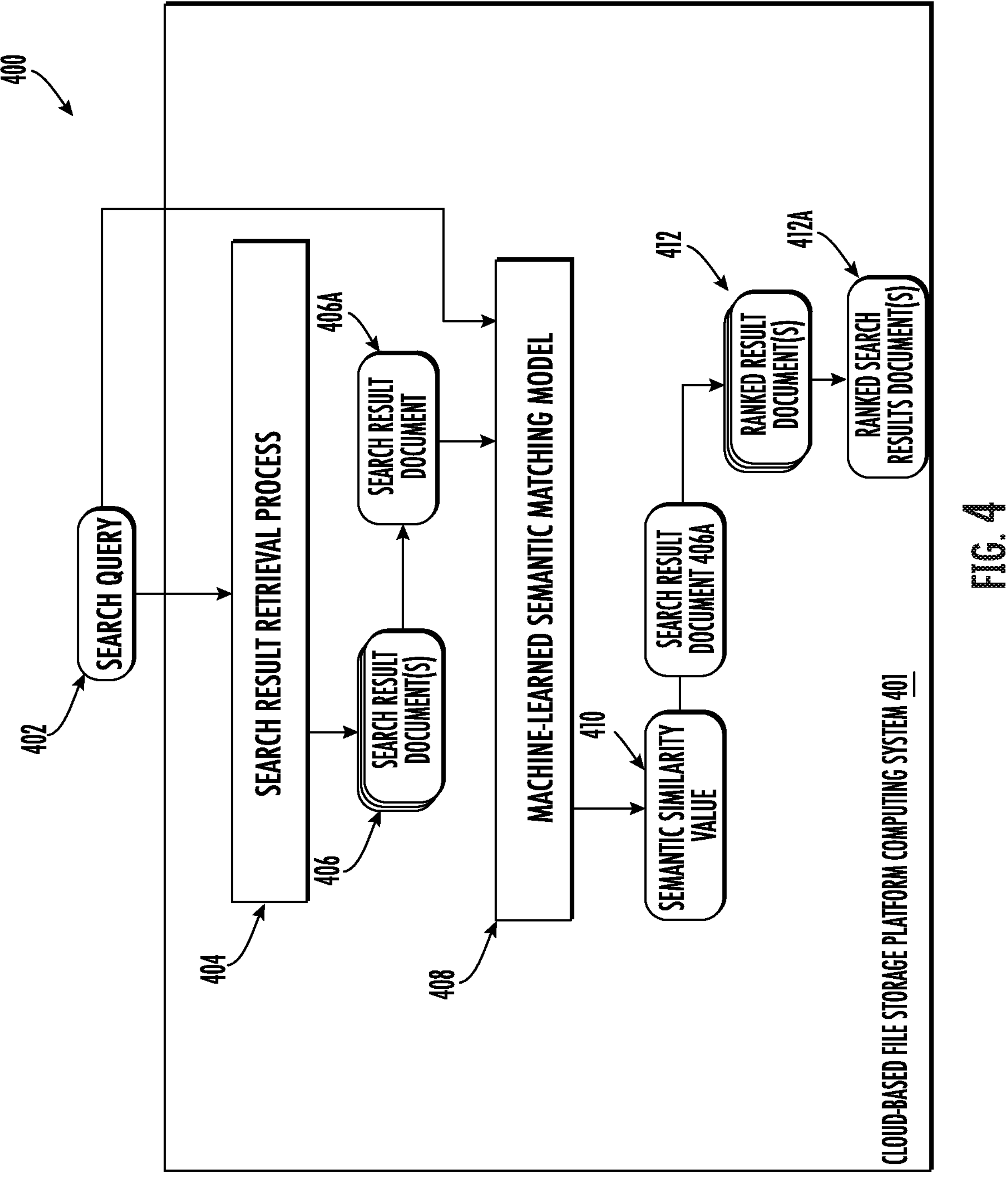
FIG. 4 is a data flow diagram that depicts a search operation utilizing a machine-learned semantic matching model according to example embodiments of the present disclosure.

FIG. 4 is a data flow diagram that depicts a search operation utilizing a machine-learned semantic matching model according to example embodiments of the present disclosure. More particularly, a cloud-based file storage platform computing system 401 can obtain a search query 402. The search query 402 can, for example, be generated by a user and input to the cloud-based file storage platform computing system 401 (e.g., via a user computing device, one or more application programming interfaces, etc.). The cloud-based file storage platform computing system 401 can retrieve search result document(s) 406 utilizing search result retrieval process 404. The search result retrieval process can be any conventional and/or machine-learned search process, and can be utilized to retrieve the search result document(s) 406 that correspond to the search query 402. The search result document(s) can include search result document 406A. The search result document 406A and the search query can be input to the machine-learned semantic matching model 408 (e.g., the machine-learned semantic matching model 312 of FIG. 3 after training is completed, etc.).

It should be noted that the search query 402 can be included in a document, can be a document, or can otherwise be processed as a document (e.g., search result document(s) 406, etc.). As such, the machine-learned semantic matching model 408 can be configured to process the search query 402 as it would a document (e.g., search result document(s) 406, etc.). Further, the search query 402 can include or correspond to the content of any previously described document (e.g., textual content, image content, etc.). As an example, the search query 402 may be or include text content describing the search query 402. As another example, a user can generate a reverse image search query for searching the cloud-based file storage platform computing system 401, and the search query 402 can be a representation (e.g., a hash representation, a latent space representation, a machine-learned encoded representation, etc.) of the image utilized for the search query 402.

More particularly, in response to obtaining the search query 402, a search result document corresponding 406A to the search query 402 can be retrieved. In some implementations, a number of additional search result document(s) 406 can be retrieved additionally. The search result document 406A can be retrieved using any sort of conventional or machine-learned technique(s) or algorithm(s) (e.g., search result retrieval process 404). As an example, the search result retrieval process 404 may retrieve the search result document 406A based on the search result document 406A being the most recently opened document stored in the cloud-based file storage platform computing system 401. As another example, the search result document 406A may be retrieved by the search result retrieval process 404 based on the search result document 406A corresponding to a certain alphabetical order amongst a plurality of documents stored in the cloud-based file storage platform computing system 401. It should be noted that any form of search result retrieval process 404 (e.g., masking, selection, discarding, etc.) for retrieving of search result document(s) 406 among a plurality of documents stored in the cloud-based file storage platform computing system 401 can be utilized. As an example, if the search query 402 includes textual content, any search result document 406 not including textual content can be excluded.

The search query 402 and the search result document 406A can be input into the machine-learned semantic matching model 408 to obtain a semantic similarity value 410 that represents an estimated semantic similarity between the search query and the search result document. The semantic similarity value 410 can be generated as it was during training (e.g., in response to input of two documents, etc.), as depicted in FIG. 3. Based on the semantic similarity value 410, the search result document 406A can be ranked among a plurality of ranked search result documents 412 as ranked search result document 412A. More particularly, a plurality of search result documents 406 can be sequentially input alongside the search query 402 to the machine-learned semantic matching model 408 to generate a plurality of semantic similarity values 410 which can be used to sequentially rank the plurality of ranked search result documents 412. Thus, in such fashion, the machine-learned semantic matching model 408 can be used to efficiently and accurately produce ranked search results 412 for a user in response to a search query 402.

Figure 5:
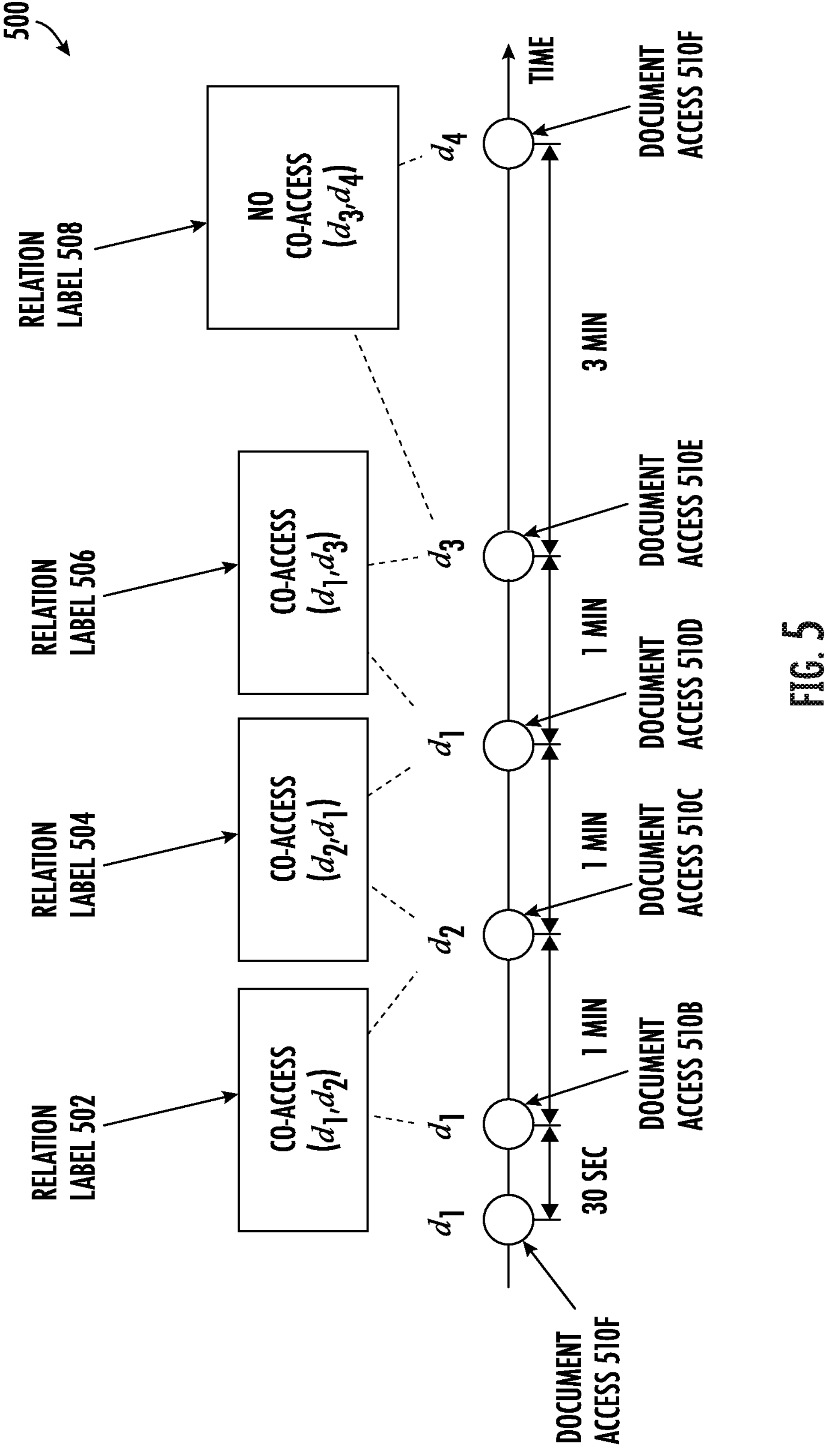
FIG. 5 depicts a data flow diagram for determining relation labels based on document activity logs according to example embodiments of the present disclosure.

FIG. 5 depicts a data flow diagram for determining relation labels based on document activity logs according to example embodiments of the present disclosure. More particularly, data flow diagram depicts a number of relation labels established between documents d1, d2, d3, and d4. It should be noted that, although not depicted, the document access events 510A-510F (e.g., document access event 510A, document access event 510B, document access event 510C, document access event 510D, document access event 510E, document access event 510F, etc.) can be established based on document activity logs respectively associated with the documents d1-d4. Further, it should be noted that each of the document access events are performed by a single user of a cloud-based file storage platform. However, in some implementations, a number of users (e.g., three users of a private group of a cloud-based file storage platform, etc.) could be associated with the access events.

Relation label 502 is a relation label between documents d1 and d2. More particularly, relation label 502 is determined based on a document access event 510B for document d1 and a document access event 510C for document d2 described by document activity logs for documents d1 and d2. It should be noted that although document access 510A occurs before document access 510B, it is not used to determine relation label 502 because document d1 is accessed subsequently at document access 510B by the user before accessing a different document (e.g., document d2 at document access 510C). As depicted, a time of 1 minute elapses between document access event 510B for document d1 and document access event 510C for document d2. Based on the amount of time between the document access events (e.g., 510B and 510C), the relation label 502 can indicate that the documents d1 and d2 are related. More particularly, the relation label 502 can be based on determining that the documents are related based on the amount of time between document access events 510D/510E being below a specified time threshold. Note that all the relation labels 502-508 relate to consecutive access events. Thus, even if access events 510C and 510E occur at times spaced apart by less than the time threshold, they will not necessarily be used to generate a relation label indicating the documents d2 and d3 are related because the access event 510D falls between them; in other words events 510C and 510D are not consecutive document access events within the complete set of document access events 510A-510F which occur in the activity segment. However, in a variant of the process of FIG. 5, relation labels indicating that two documents are related may be generated when there are access events for those documents at respective times spaced apart by less than the time threshold, irrespective of whether those access events are consecutive access events.

Relation label 504 is a relation label established between documents d2 and d1. More particularly, relation label 504 is determined based on a document access event 510C for document d2 and a document access event 510D for document d1 as described by document activity logs for documents d1 and d2. As depicted, a time of 1 minute elapses between document access event 510C for document d2 and document access event 510D for document d1. Based on the amount of time between the document access events (e.g., 510C and 510D), the relation label 504 can indicate that the documents d2 and d1 are related. More particularly, the relation label 504 can be determined based on determining that the documents are related based on the amount of time between document access events 510C/510D being below a specified time threshold. It should be noted that in some implementations, the multiple relation labels established between documents d1 and d2 (e.g., relation labels 502 and 504) can be used to further reinforce the relatedness of the documents d1 and d2 during training. In such fashion, multiple relation labels between documents can be used to further strengthen the relatedness of the documents when evaluated by a loss function that evaluates a difference between the relation labels and a similarity value generated by a machine-learned semantic matching model during training of the machine-learned semantic matching model.

Relation label 506 is a relation label established between documents d1 and d3. More particularly, relation label 506 is determined based on a document access event 510D for document d1 and a document access event 510E for document d3 as described by document activity logs for documents d1 and d3. As depicted, a time of 1 minute elapses between document access event 510D for document d1 and document access event 510E for document d3. Based on the amount of time between the document access events (e.g., 510D and 510E), the relation label 504 can indicate that the documents d1 and d3 are related. More particularly, the relation label 506 can be determined based on determining that the documents are related based on the amount of time between document access events 510D/510E being below a specified time threshold.

Relation label 508 is a relation label established between documents d3 and d4. More particularly, relation label 508 is determined based on a document access event 510E for document d3 and a document access event 510F for document d4 as described by document activity logs for documents d3 and d4. As depicted, a time of 3 minutes elapses between document access event 510E for document d3 and document access event 510F for document d4. Based on the amount of time between the document access events (e.g., 510E and 510F), the relation label 504 can indicate that the documents d3 and d4 are not related. More particularly, the relation label 508 can be determined based on determining that the documents are related based on the amount of time between document access events 510E/510F being above a specified time threshold. Thus, in such fashion, relation labels can be established based on an amount of time between document access events of document pairs being above or below a specified time threshold. Note that all the relation labels 502-508 relate to consecutive access events. Thus, even if access events 510C and 510E occur at times spaced apart by less than the time threshold, they will not be used to generate a relation label indicating the documents d2 and d3 are related because the access event 510D falls between them; in other words events 510C and 510D are not consecutive document access events within the complete set of document access events 510A-510F which occur in the activity segment. However, in a variant of the process of FIG. 5, relation labels indicating that two documents are related may be generated when there are access events for those documents at respective times spaced apart by less than the time threshold, irrespective of whether those access events are consecutive access events.

Example Methods

Figure 6:
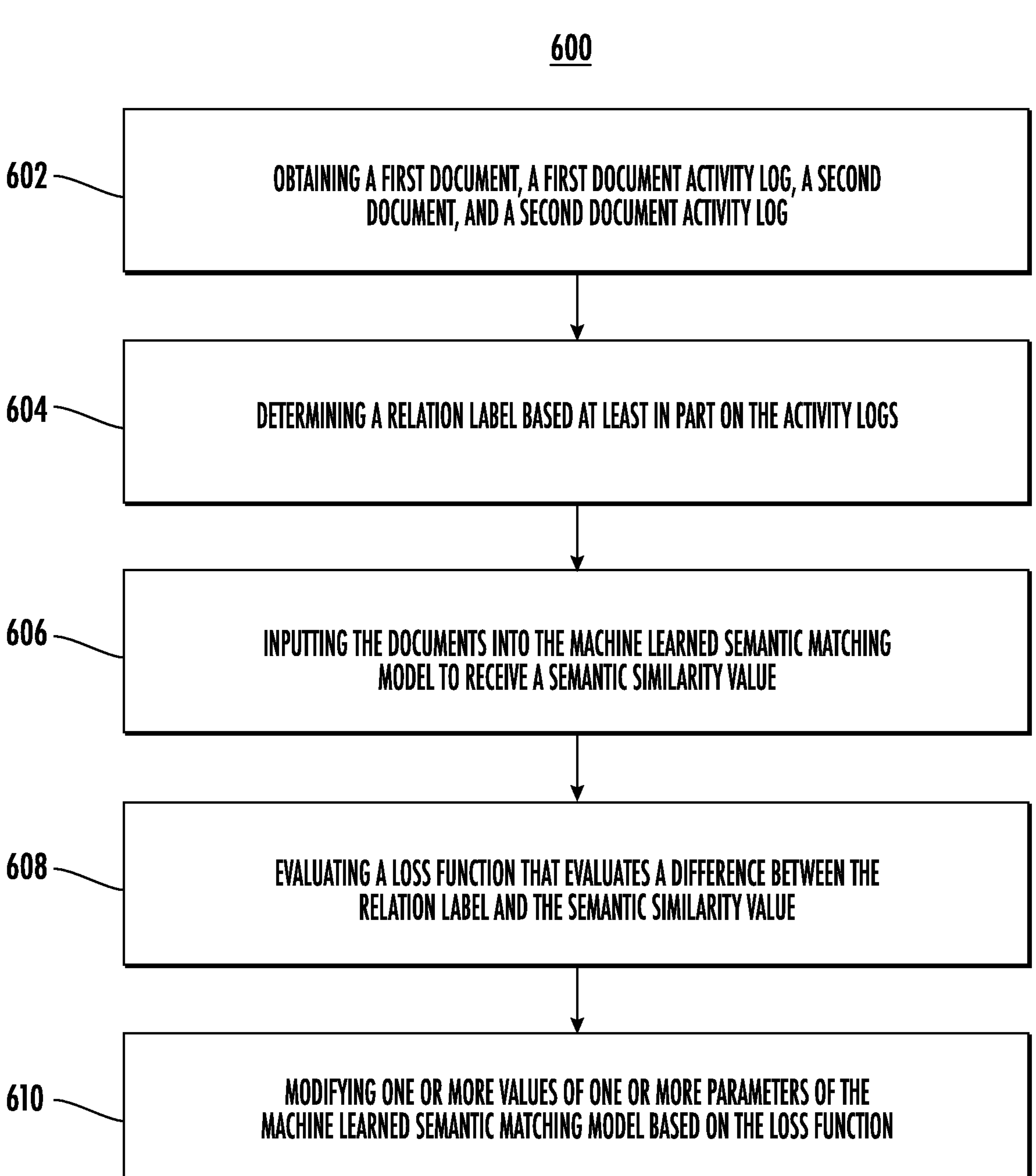
FIG. 6 depicts a flow chart diagram of an example method to perform training of a machine-learned semantic matching model using document activity logs according to example embodiments of the present disclosure.

FIG. 6 depicts a flow chart diagram of an example method to perform training of a machine-learned semantic matching model using document activity logs according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, the method 600 can include obtaining a first document, a first document activity log, a second document, and a second document activity log. More particularly, a computing system (e.g., a training computing system 150 of FIG. 1, etc.) can obtain a first document, a first document activity log associated with the first document, a second document, and a second document activity log associated with the second document. In some implementations, the first document and the second document can include content. As an example, the documents may include textual content. As another example, the documents may include image content. As yet another example, the documents may include file content (e.g., document metadata, file paths, etc.). As such, the first and second documents of the present disclosure can refer to any sort and/or type of data (e.g., image data, textual data, metadata, etc.).

In some implementations, the document activity logs (e.g., the first document activity log and the second document activity log, etc.) can respectively describe one or more access events associated with a respective document. As an example, the first document activity log may describe three document access events associated with the first document. As another example, the second document activity log may describe seventeen document access events associated with the second document.

In some implementations, a document access event can include a document access type. A document access type can include and/or describe the type of access event that occurred (e.g., a sharing, opening, or editing of the document, etc.). As an example, the initial creation or upload of a document to a cloud-based file storage platform can constitute a document creation event. Similarly, as another example, the opening of a document after creation can constitute a document opening event. It should be noted that any interaction or access of the document can constitute a document access event (e.g., editing the document, moving the document, uploading the document, downloading the document, commenting on the document, deleting the document, renaming the document, viewing the document, etc.). In some implementations, the document access event can associate the document access type with a specific user. As an example, for a multi-user cloud-based document storage platform, a document access event can describe a user who performed a document opening event (e.g., by recording a user identifier of the user, etc.).

In some implementations, the document access event can include an access time. More particularly, the document access event can include an access time (e.g., timestamp, etc.) that corresponds to the time that a document access event occurred. As an example, a first user can edit a document at 21:42:00. In response, the document activity log can include a document access event that includes a document editing event and a corresponding access time of 21:42:00. As another example, the first user can share the document at 21:45:05. In response, the document log can include a document access event that includes a document sharing event and a corresponding access time of 21:45:05.

At 604, the method 600 can include determining a relation label based at least in part on the activity logs. More particularly, the computing system can determine the relation label based on the first document activity log and the second document activity log. The relation label can indicate whether the first document and the second document are related. In some implementations, the relation label can be determined based on access time differences in the respective document activity logs. More particularly, a relation label can be determined based on a difference in time between an access of the first document and an access of the second document.

As an example, the first document activity log can indicate that the first document was accessed (e.g., edited, opened, shared, etc.) at 15:05:00. The second document activity log can indicate that the second document was accessed at 15:06:59. Based on the difference in time between the first document access event and the second document access event, the relation label can indicate that the first document and the second document are related (e.g., a co-access of the documents occurred). As another example, the first document activity log can indicate that the first document was accessed (e.g., edited, opened, shared, etc.) at 15:05:00. The second document activity log can indicate that the second document was accessed at 17:06:59. Based on the difference in time between the first document access event and the second document access event, the relation label can indicate that the first document and the second document are not related (e.g., a co-access of the documents did not occur). It should be noted that the amount of time in between document access events can be a predetermined co-access time threshold (e.g., a co-access occurrence time, etc.). For example, the co-access time threshold can be manually set by a user to be a certain amount of time (e.g., two minutes, three minutes, etc.). As another example, the co-access time threshold can be dynamically determined based on a number of factors (e.g., a number of documents, a number of search results, a type of access event, user identity(s) associated with access event(s), etc.).

More particularly, in some implementations, a relation label can indicate that two documents are related (e.g., a co-access occurred, etc.) if a user opens the two documents in sequence and within a k-minute time window. While there are multiple alternative ways to determine the relation label, a predetermined co-access threshold can generally be found to be conceptually simple, yet empirically effective. Further, the relation label can be motivated by the fact that users often open multiple related documents in a single session, yet can also strive to reduce the number of false positive labels by keeping a narrow time window and discarding non-consecutive co-accesses.

As an example, first segments of a user's activity logs can be sampled called activity segments. Each activity segment can contain events from the same user in a consecutive time window. For each activity segment, a set of documents the user accessed can be collected, $$D = \{d_i\}_{i=1}^{|D|}.$$

From the document set, all the unordered pairs of documents in the document set can be collected, $P_D=\{\{d, d'\}|d, d'\in D\}$. Relation labels (e.g., co-access labels, etc.) can be extracted for all the document pairs of $P_D$. The relation labels (e.g., co-access labels, etc.) $Y_{d,d'}$ can be defined as:

$$Y_{d,d'} = \begin{cases} 1, & \text{coaccess}(d, d') > 0 \\ 0, & \text{otherwise} \end{cases},$$

Where coaccesses(d,d')>0 can be the number of co-access between d and d' in the activity segment. For example, for a collected document set D={d1, d2, d3, d4}, the extracted co-access labels for the document pairs could be: $Y_{d1,d2}=Y_{d1,d3}=1$ (e.g., document pairs d1/d2 and document pairs d1/d3) were co-accessed within the threshold time, etc., and $Y_{d1,d4}=Y_{d2,d3}=Y_{d2,d4}=Y_{d3,d4}=0$ (e.g., document pairs d1/d4, d2/d3, d2/d4, and d3/d4 were not co-accessed within a threshold time).

As such, a training dataset comprising documents and document activity logs:

$$T = \bigcup_{i=1}^{N} \{(d, d', Y_{d,d'}) \mid \{d, d'\} \in P_D^{(i)}\}$$

can be collected from a large number of activity segments, where Nis the number of the segments.

In some implementations, the relation label can be further based at least in part on a first document access type and a second document access type described by the second document activity log. As an example, each document access type (e.g., a document creation event, document opening event, document sharing event, etc.) can be weighted differently. For example, a document sharing event may be weighed more heavily than a document opening event. As another example, a document creation event may be weighed more heavily than a document editing event. The weights of the types of access events described by the document activity logs can be used, alongside the amount of time between access events, to determine the relation label. As an example, the determination of the relation label can require a certain weight of combined access events in addition to a certain amount of time between the access events for the relation label to indicate that the documents are related.

In some implementations, the relation label can be a binary value. The binary value relation label can indicate that the first and second documents are related or that the first and second documents are not related. Alternatively, in some implementations, the relation label can be a scalar value that indicates a degree of relatedness between the first document and the second document. As an example, if the access event types described by the document activity logs are strongly weighted, and the amount of time between access events is lower than a threshold amount, the relation label can include a scalar value that indicates the first document and the second document are strongly related. As another example, if the access event types described by the document activity logs are weakly weighted, and the amount of time between access events is higher than a threshold amount, the relation label can include a scalar value that indicates the first document and the second document are weakly related. In such fashion, the scalar value can indicate a degree of relatedness between the first document and the second document.

At 606, the method 600 can include inputting the documents into the machine-learned semantic matching model to receive a semantic similarity value. More particularly, the computing system can input the first document and the second document into a machine-learned semantic matching model configured to obtain the first document and second document and generate, for receipt by the computing system, a semantic similarity value that describes a semantic similarity between the first document and the second document. The machine-learned semantic matching model can be or can otherwise include one or more neural networks (e.g., deep neural networks) or the like. Neural networks (e.g., deep neural networks) can be feed-forward neural networks, convolutional neural networks, and/or various other types of neural networks. As an example, the machine-learned semantic matching model can be or can otherwise include one or more recurrent neural networks.

The machine-learned semantic matching model can be configured to obtain the first document and the second document. The machine-learned semantic matching model can be configured to generate a semantic similarity value based on the first document and the second document. The semantic similarity value can represent an estimated semantic similarity between the first document and the second document. As an example, the semantic similarity value can be or otherwise include a scalar value estimating a degree of estimated semantic similarity between the first document and the second document (e.g., 50% estimated semantic similarity, 0.8 estimated semantic similarity, etc.). As another example, the semantic similarity value can be a binary value representing an estimate as to whether the first document is semantically similar to the second document.

In some implementations, the machine-learned semantic matching model can be configured to generate the semantic similarity value by determining a first content embedding and a second content embedding. More particularly, the first content embedding can be determined for the first document based on at least a portion of content of the first document, and the second content embedding for the second document can be determined based on at least a portion of content of the second document. As described previously, the content embedding can be an embedding of the content included in the document (e.g., a text embedding for text content, an image embedding for image content, etc.). The machine-learned semantic matching model can then generate the semantic similarity value based on the first content embedding and the second content embedding.

In some implementations, the content of the first document can include first textual data and the content of the second document can include second textual data. As such, the first content embedding can include a first textual embedding and the second content embedding can include a In some implementations, the machine-learned semantic matching model can be configured to determine the first textual embedding by selecting one or more character subsets (e.g., n-grams, etc.) from the first textual data of the first document. As an example, the first textual data of the first document can include characters "COMP VIS: COMPUTER VISION RESEARCH PERIODICAL 2017." One or more character subsets can be selected from a plurality of character subsets (e.g., COMP, VIS, COMP, UTER, COMPUTER, VIS, ION, VISION, etc.) based on an appearance frequency of the character subsets (e.g., COMP, VIS, etc.). For example, to use the previous example characters "COMP VIS: COMPUTER VISION RESEARCH PERIODICAL 2017," the character subsets "COMP" and "VIS" may be selected as they appear more frequently than other character subsets (e.g., n-grams, etc.).

In some implementations, the selected one or more character subsets can be projected into a learned k dimensional vector space to form n-gram embeddings. The n-gram embeddings can be averaged to determine the first textual embedding. The averaging of the one or more character subsets can be performed using any conventional averaging techniques and/or can be performed by one or more layers of the machine-learned semantic matching model. The second textual embedding can be determined in the same manner as the first textual embedding.

More particularly, in some implementations, the machine-learned semantic matching can be or otherwise include a machine-learned concatenation semantic matching model. The machine-learned concatenation semantic matching model can first compute an embedding for the text documents t and t'. Each character subset (e.g., n-gram) in the texts t and t' can mapped to an embedding where only the most frequent character subsets (e.g., n-grams) are retained to limit the vocabulary and make the problem computationally feasible. The character subsets (e.g., n-grams) for t and t' can then be averaged to obtain emb(t) and emb(t') respectively. The representations are concatenated to obtain a joint representation:

$$h_0 = [emb(t), emb(t')].$$

The joint representation $h_0$ can be passed through one or more dense feed-forward layers of the machine-learned semantic matching model, where each layer $h_i$ is defined as:

$$h_i = \phi(W_i h_{i-1} + b_i)$$

where (P can be an activation function (e.g., rectified linear unit (ReLU), tanh, etc.). The last layer of the machine-learned concatenation semantic matching network, $h_k$, can be reduced to a scalar value and mapped to a probability via a sigmoid function:

$$sim(t, t') = \text{sigmoid}\ (W_{final} h_k + b_{final}).$$

Alternatively, in some implementations, the machine-learned semantic matching model can be or otherwise include a machine-learned siamese semantic matching model. The machine-learned siamese semantic matching model can embed the text documents t and t' to their respective textual embeddings emb(t) and emb(t'). The text embeddings can be passed through a shared feed-forward neural network to formally determine:

$$h_0^t = emb(t);\ h_0^{t'} = emb(t');\ h_i^t = \phi(W_i h_{i-1}^t + b_i);\ \text{and}\ h_i^{t'} = \phi(W_i h_{i-1}^{t'} + b_i).$$

It should be noted that the weights $W_i$ and $b_i$ at each layer can be shared for both t and t'. The output vectors of the last layer, $$h_k^t \text{ and } h_k^{t'},$$

can be joined via dot product and then passed through a sigmoid to obtain:

$$sim(t, t') = \text{sigmoid}(h_k^t * h_k^{t'}).$$

After inputting the first document and the second document to the machine-learned semantic matching model, the semantic similarity value representing the estimated semantic similarity between the first document and the second document can be received.

At 608, the method 600 can include evaluating a loss function that evaluates a difference between the relation label and the semantic similarity value. As such, in some implementations, the difference between the relation label and the semantic similarity value can serve as a supervisory training signal to the machine-learned semantic matching model. As an example, the semantic similarity value may indicate that the first document and the second document are strongly semantically similar, while the relation label may indicate that the first document and the second document are not related. The loss function can evaluate the difference between the semantic similarity value and the relation label.

At 610, the method 600 can include modifying one or more values of one or more parameters of the machine-learned semantic matching model based on the loss function. As an example, the difference evaluated by the loss function can be backpropagated through the machine-learned semantic similarity model to determine values associated with one or more parameters of the model to be updated. The one or more parameters can be updated to reduce the difference evaluated by the loss function (e.g., using an optimization procedure, such as a gradient descent algorithm).

More particularly, as an example, the semantic matching model can be trained by minimizing the weighted cross-entropy loss defined as follows:

$$-\sum_{i=1}^{N} \sum_{(d,d' \in P_D^{(i)})}^{N} y_{d,d'}^{(i)} \log(sim(d, d')) + \lambda\left(1 - y_{d,d'}^{(i)}\right) \log(1 - sim(d, d'))$$

in which the titles of the first document and second document are used as the textual content for each document when scoring sim(d, d') and $\lambda \in (0,1]$ can be used as a hyperparameter to down-weight the loss for negative document pairs. The weighting can be used to address data imbalance problems in the dataset. However, it should be noted that in practice, a small percentage of document pairs are generally co-accessed, and the majority of document pairs are not co-accessed. As pointed out above, in a variation the loss function may alternatively be based on average relation labels generated as an average for multiple activity segments.

Figure 7:
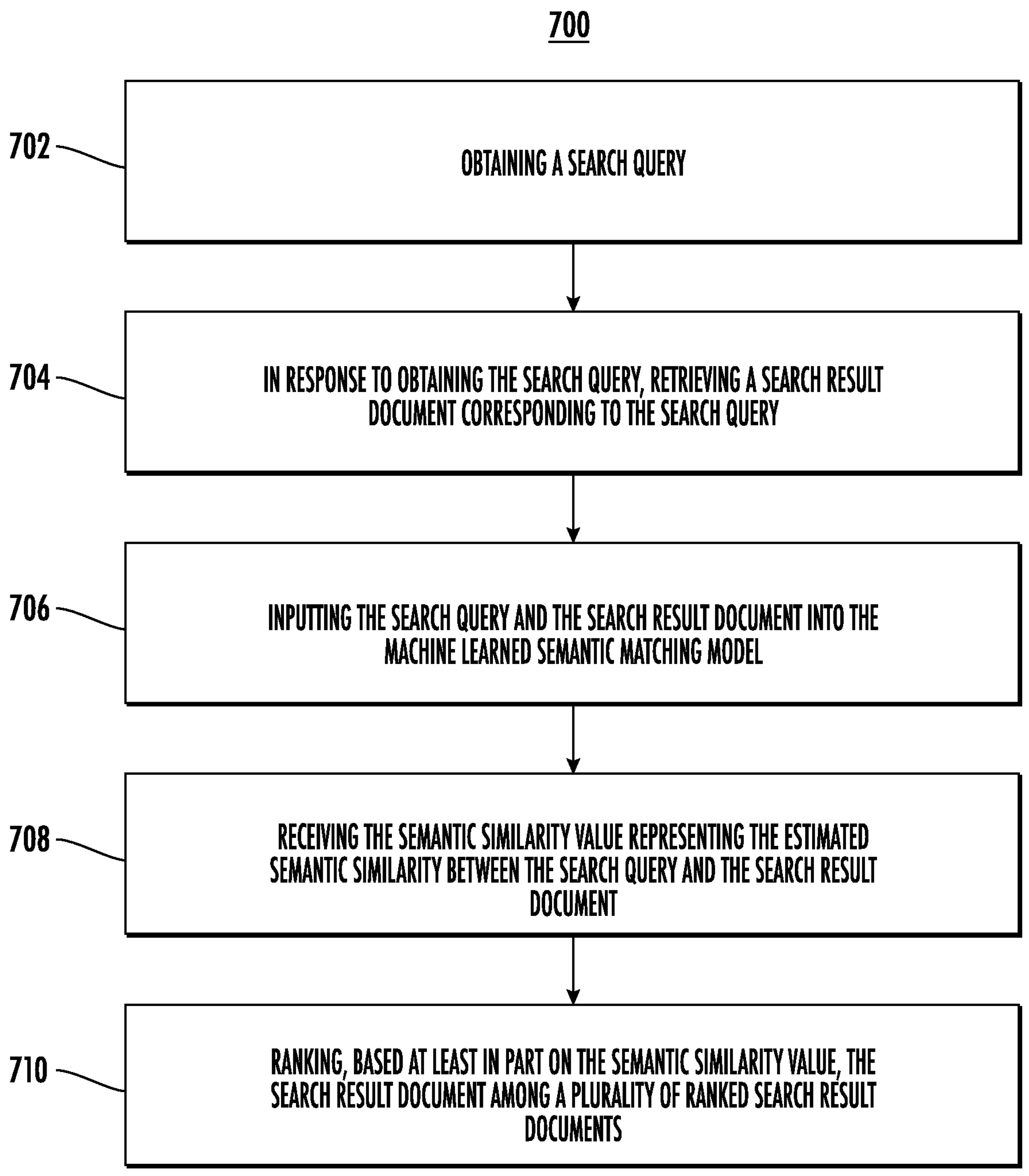
FIG. 7 depicts a flow chart diagram of an example method to perform search operations for a cloud-based file storage platform using a machine-learned semantic matching model according to example embodiments of the present disclosure.

FIG. 7 depicts a flow chart diagram of an example method to perform search operations for a cloud-based file storage platform using a machine-learned semantic matching model according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, the method 700 can include obtaining a search query. As an example, the search query may be received from a user searching for documents in a cloud-based file storage platform. It should be noted that the search query can be included in a document, can be a document, or can otherwise be processed as a document. As such, the machine-learned semantic matching model can be configured to process the search query as it would a document. Further, the search query can include or correspond to the content of any previously described document (e.g., textual content, image content, etc.). As an example, the search query may be or include text describing the search query. As another example, a user can perform a reverse image search in a cloud-based storage platform, and the search query can be a hash representation or latent space representation of the image utilized for the query.

At 704, the method 700 can include, in response to obtaining the search query, retrieving a search result document corresponding to the search query. The search result document can be retrieved using any sort of conventional or machine-learned technique(s) or algorithm(s). As an example, the search result document may be retrieved based on the search result document being the most recently opened document. As another example, the search result document may be retrieved based on the search result document corresponding to a certain alphabetical order amongst a plurality of documents. It should be noted that any form of operations (e.g., masking, selection, discarding, etc.) for retrieving of search result document(s) among a plurality of documents can be utilized. As an example, if the search query includes textual content, any search result document not including textual content can be excluded.

At 706, the method 700 can include inputting the search query and the search result document into the machine-learned semantic matching model to obtain a semantic similarity value that represents an estimated semantic similarity between the search query and the search result document. The semantic similarity value can be generated by the machine-learned model as described in step 606 of FIG. 6.

At 708, the method 700 can include receiving the similarity value representing the semantic similarity between the search query and the search result document. The similarity value can be the same or substantially similar type of semantic similarity value as described in step 606 of FIG. 6.

At 710, the method 700 can include ranking, based on the semantic similarity value, the search result document among a plurality of ranked search result documents. More particularly, a plurality of previous search result documents can be sequentially input alongside the search query to the machine-learned semantic matching model to generate a plurality of semantic similarity values which can be used to sequentially rank the plurality of ranked search result documents. Thus, in such fashion, the machine-learned semantic matching model can be used to efficiently and accurately produce ranked search results for a user in response to a search query.

Alternatively, or additionally, in some implementations, the ranked search results can be utilized to recluster the plurality of ranked search results based on the semantic similarity values of the documents. More particularly, the search result documents can be clustered according to a pre-existing clustering order (e.g., associated with each other by a certain relationship, etc.). As an example, the documents may be clustered together based on an initial perceived semantic similarity to facilitate faster search result document retrieval. Based on the semantic similarity values assigned to each of the plurality of search result documents, the search result documents can be accordingly reclustered (e.g., declustered and then reclustered, etc.) based on a difference between the initial clusterings of the documents and the semantic similarity values between documents as determined by the machine-learned semantic matching model.

In some implementations, the ranked search results can be provided to a user. As an example, a user can enter a search query to a user device (e.g., smartphone, desktop computer, terminal, etc.) for searching a search environment such as a cloud-based file storage platform. Search results can be retrieved based on the search query entered to the user device, and can be ranked accordingly using the machine-learned semantic matching model. The ranked search results can be provided to the user device (e.g., smartphone, etc.) in a user interface corresponding to the interface utilized to enter the search query (e.g., a web page associated with the cloud-based file storage platform, etc.).

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for self-supervised training of a machine-learned semantic matching model using document activity logs, the method comprising:

obtaining, by one or more computing devices, a first document, a first document activity log associated with the first document, a second document, and a second document activity log associated with the second document, wherein the first document activity log and the second document activity log indicate a co-access of the first document and the second document;

inputting, by the one or more computing devices, the first document and the second document into the machine-learned semantic matching model to receive, from the machine-learned semantic matching model, a semantic similarity value representing an estimated semantic similarity between the first document and the second document; and training, by the one or more computing devices, one or more values of one or more parameters of the machine-learned semantic matching model based on a loss function that compares a relation label and the semantic similarity value, the relation label based on the co-access of the first document and the second document.

2. The computer-implemented method of claim 1, wherein the machine-learned semantic matching model is configured to generate the semantic similarity value representing the estimated semantic similarity between the first document and the second document by:

determining a first content embedding for the first document based on at least a portion of content of the first document;

determining a second content embedding for the second document based on at least a portion of content of the second document; and generating, based on the first content embedding and the second content embedding, the semantic similarity value representing the estimated semantic similarity between the first document and the second document.

3. The computer-implemented method of claim 2, wherein the content of the first document and the content of the second document respectively comprise at least one of:

first image data and second image data;

first video data and second video data;

first textual data and second textual data; or first file data and second file data.

4. The computer-implemented method of claim 2, wherein:

the content of the first document comprises first textual content data and the content of the second document comprises second textual data;

the first content embedding comprises a first textual embedding and the second content embedding comprises a second textual embedding; and determining the first textual embedding and the second textual embedding comprises, for each of the first textual embedding and the second textual embedding:

selecting one or more character subsets from the textual data of the corresponding document based at least in part on an appearance frequency for each character subset of a plurality of character subsets of the textual data of the document, each of the plurality of character subsets comprising one or more characters from the text of the document; and averaging the one or more character subsets to determine the textual embedding.

5. The computer-implemented method of claim 1, wherein the first document activity log and the second document activity log respectively describe one or more access events associated with the first document and the second document, each of the one or more access events comprising an access type and an access time.

6. The computer-implemented method of claim 5, wherein the access type comprises:

a document sharing event;

a document opening event;

a document renaming event;

a document annotation event;

a document moving event;

a document downloading event;

a document editing event; or a document creation event.

7. The computer-implemented method of claim 5, wherein the relation label is further based at least in part on a difference in time between a first document access time described by the first document activity log and a second document access time described by the second document activity log.

8. The computer-implemented method of claim 6, wherein the relation label is further based at least in part on a first document access type described by the first document activity log and a second document access type described by the second document activity log.

9. The computer-implemented method of claim 1, further comprising:

obtaining, by the one or more computing devices, a search query from a user and a search result document corresponding to the search query;

inputting, by the one or more computing devices, the search query and the search result document to the machine-learned semantic matching model to obtain a second semantic similarity value representing an estimated semantic similarity between the search query and the search result document; and ranking, by the one or more computing devices, based on the second semantic similarity value, the search result document among a plurality of ranked search result documents corresponding to the search query.

10. The computer-implemented method of claim 9, further comprising providing, by the one or more computing devices, the plurality of ranked search result documents to the user.

11. One or more tangible, non-transitory computer readable media storing computer-readable instructions that when executed by one or more processors cause the one or more processors to perform operations for self-supervised training of a machine-learned semantic matching model using document activity logs, the operations comprising:

obtaining a first document, a first document activity log associated with the first document, a second document, and a second document activity log associated with the second document, wherein the first document activity log and the second document activity log indicate a co-access of the first document and the second document;

inputting the first document and the second document into a machine-learned semantic matching model to receive, from the machine-learned semantic matching model, a semantic similarity value representing an estimated semantic similarity between the first document and the second document; and training one or more values of one or more parameters of the machine-learned semantic matching model based on a loss function that compares a relation label and the semantic similarity value, the relation label based on the co-access of the first document and the second document.

12. The one or more tangible, non-transitory computer readable media of claim 11, wherein the machine-learned semantic matching model is configured to generate the semantic similarity value representing the estimated semantic similarity between the first document and the second document by:

determining a first content embedding for the first document based on at least a portion of content of the first document;

determining a second content embedding for the second document based on at least a portion of content of the second document; and generating, based on the first content embedding and the second content embedding, the semantic similarity value representing the estimated semantic similarity between the first document and the second document.

13. The one or more tangible, non-transitory computer readable media of claim 12, wherein:

the content of the first document comprises first textual content data and the content of the second document comprises second textual data;

the first content embedding comprises a first textual embedding and the second content embedding comprises a second textual embedding; and determining the first textual embedding and the second textual embedding comprises, for each of the first textual embedding and the second textual embedding:

selecting one or more character subsets from the textual data of the document based at least in part on an appearance frequency for each character subset of a plurality of character subsets of the textual data of the document, each of the plurality of character subsets comprising one or more characters from the text of the document;

mapping each of the one or more selected character subsets to one or more respective n-gram embeddings; and averaging the one or more n-gram embeddings to determine the textual embedding.

14. The computer-implemented method of claim 1, wherein the first document activity log and the second activity log indicate the co-access of the first document and the second document based at least in part on a difference between a first access time of the first document and a second access time of the second document being within a predetermined time threshold.

15. The computer-implemented method of claim 14, wherein the co-access of the first document and the second document is further determined based on the first document and the second document being accessed consecutively.

* * * * *